No. 654,133. Patented July 24, 1900.
T. CAHILL.
TYPE WRITING MACHINE.
(Application filed Feb. 1, 1898.)
(No Model.) 13 Sheets—Sheet 2.

Attest:
A. M. Poynton
Arthur T. Cahill.

Inventor:
Thaddeus Cahill

No. 654,133.  
T. CAHILL.  
TYPE WRITING MACHINE.  
(Application filed Feb. 1, 1898.)  
Patented July 24, 1900.
(No Model.)  
13 Sheets—Sheet 3.
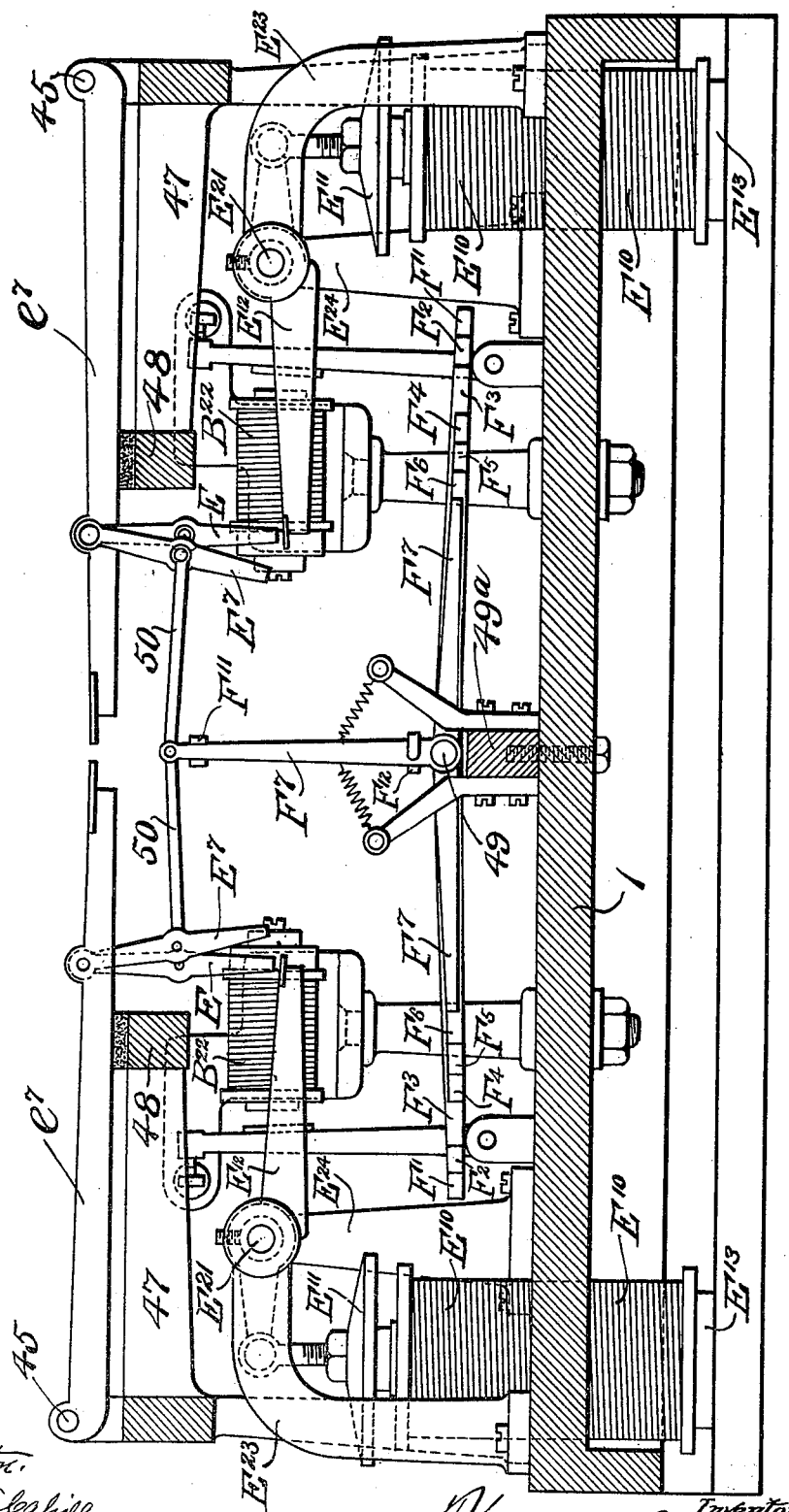

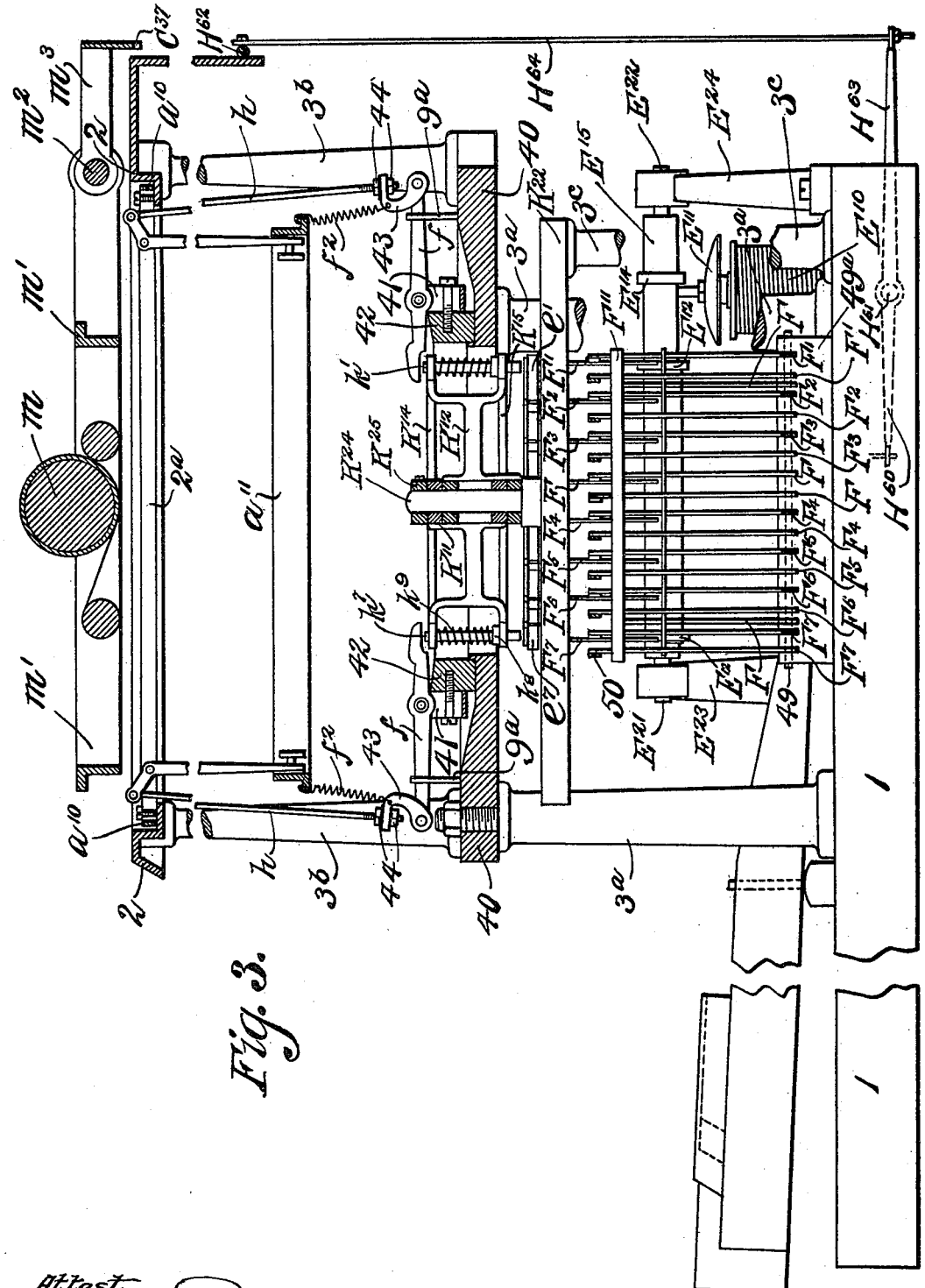

No. 654,133. Patented July 24, 1900.
T. CAHILL.
TYPE WRITING MACHINE.
(Application filed Feb. 1, 1898.)
(No Model.) 13 Sheets—Sheet 5.

Attest:
Inventor,
Thaddeus Cahill

Figure 4:
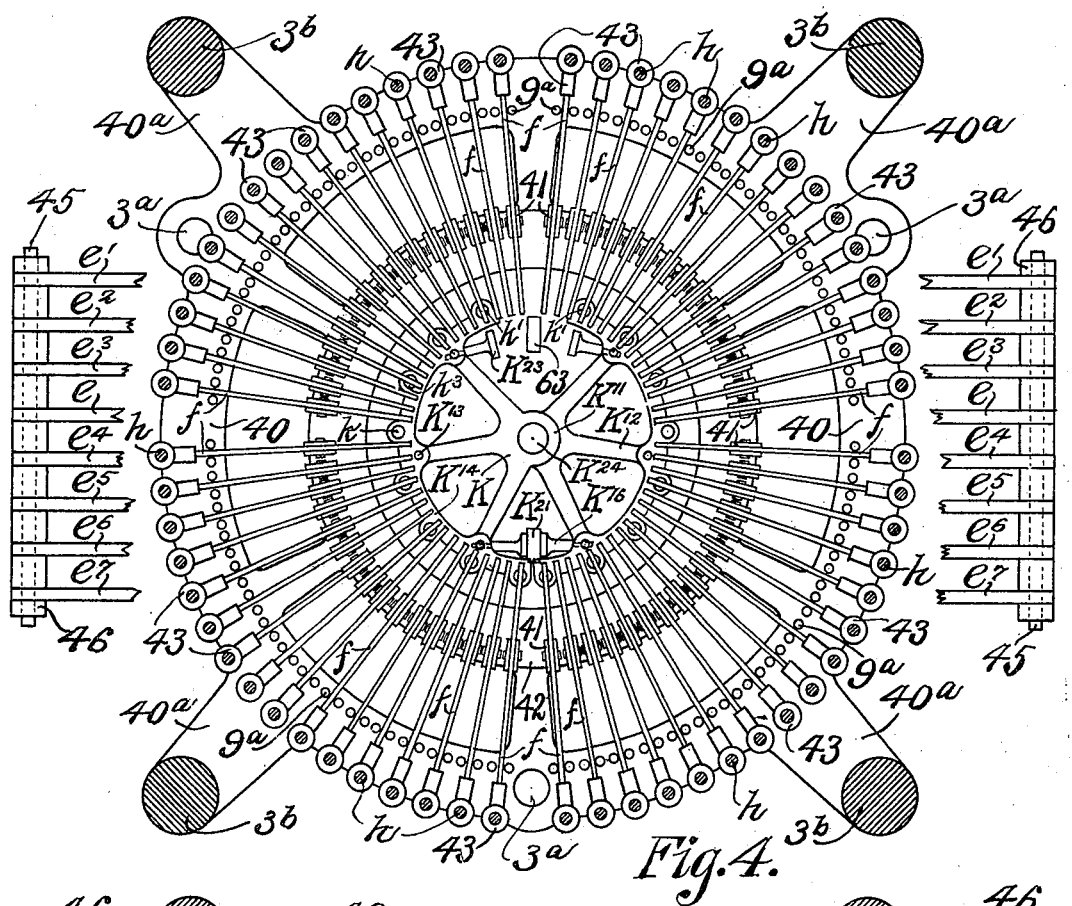

No. 654,133. Patented July 24, 1900.
T. CAHILL.
TYPE WRITING MACHINE.
(Application filed Feb. 1, 1898.)
(No Model.) 13 Sheets—Sheet 6.
Fig. 4ª.
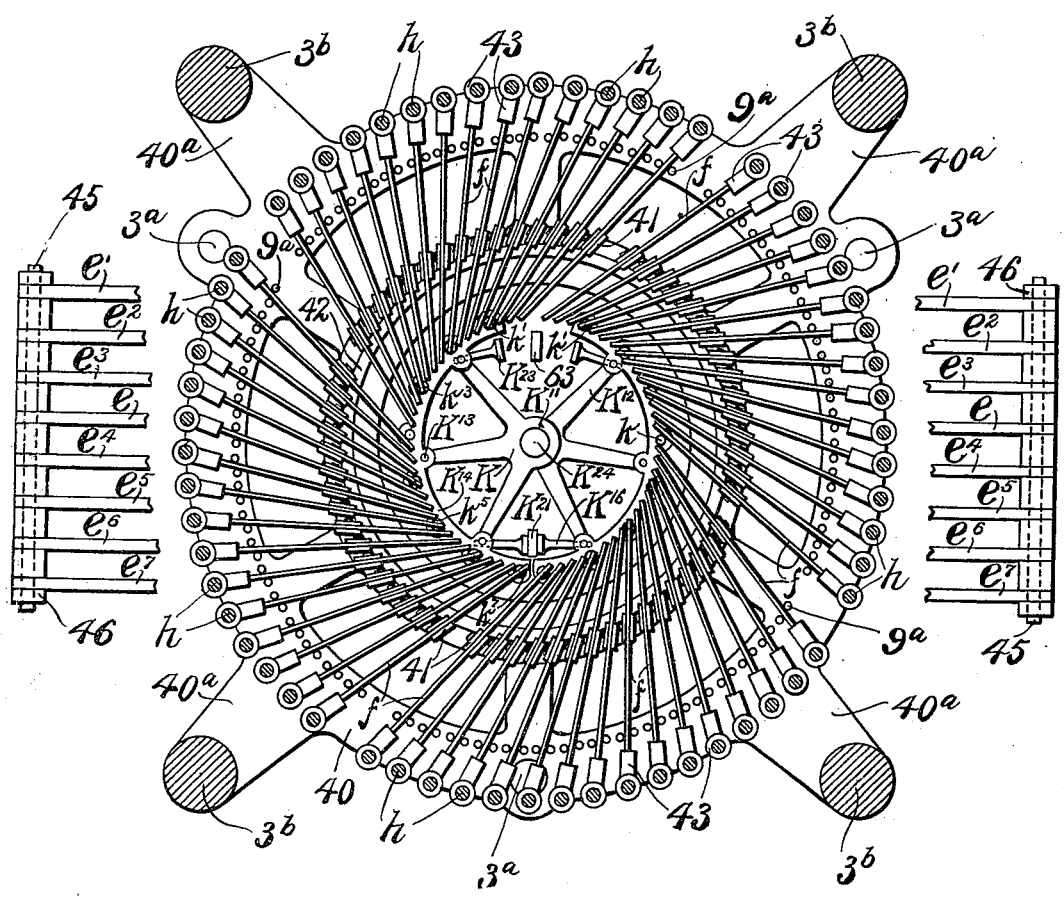

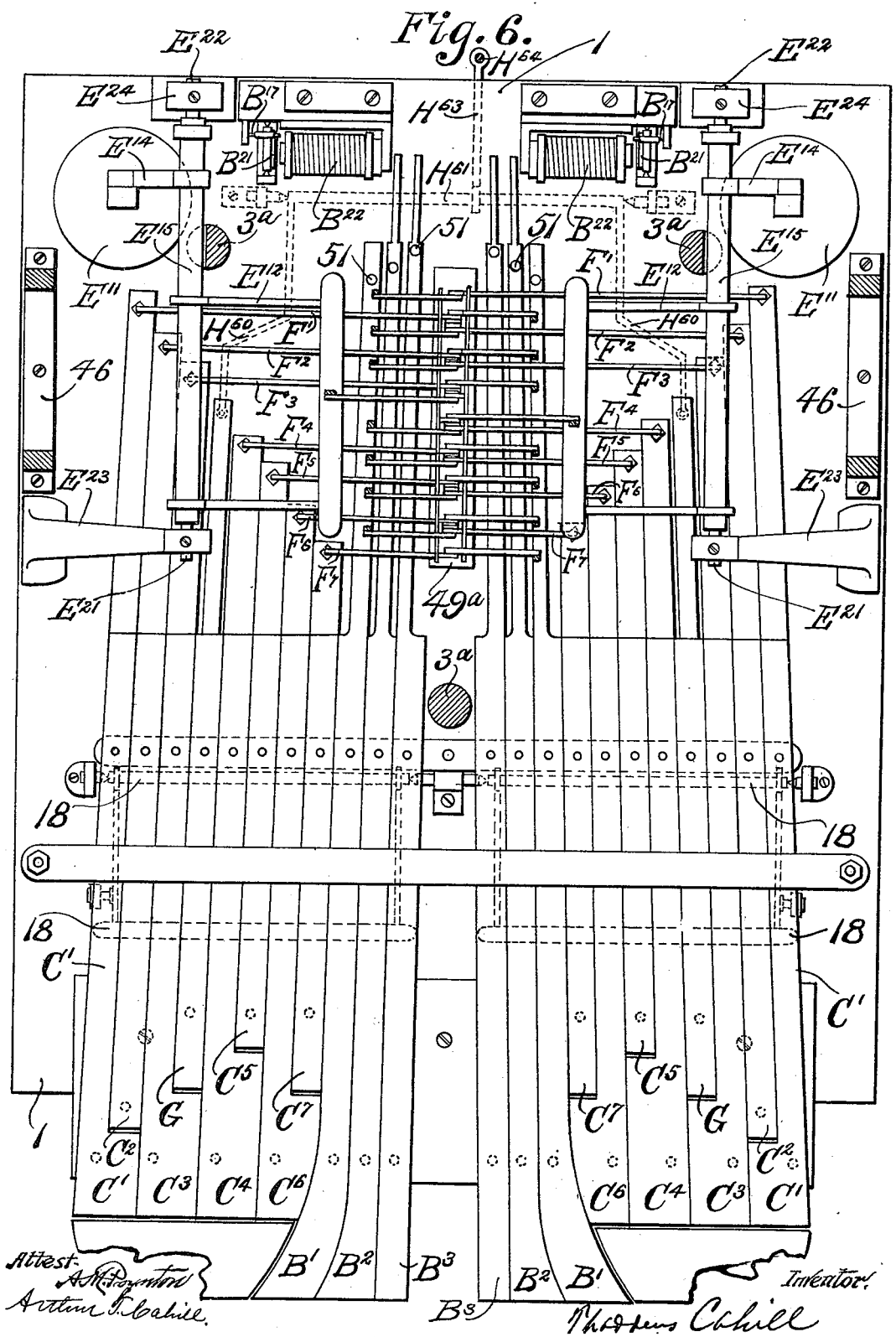

No. 654,133. Patented July 24, 1900.
T. CAHILL.
TYPE WRITING MACHINE.
(Application filed Feb. 1, 1898.)
(No Model.) 13 Sheets—Sheet 8.

No. 654,133. Patented July 24, 1900.
T. CAHILL.
TYPE WRITING MACHINE.
(Application filed Feb. 1, 1898.)
(No Model.) 13 Sheets—Sheet 9.

No. 654,133.  
T. CAHILL.  
TYPE WRITING MACHINE.  
(Application filed Feb. 1, 1898.)  
Patented July 24, 1900.
(No Model.)  
13 Sheets—Sheet 11.
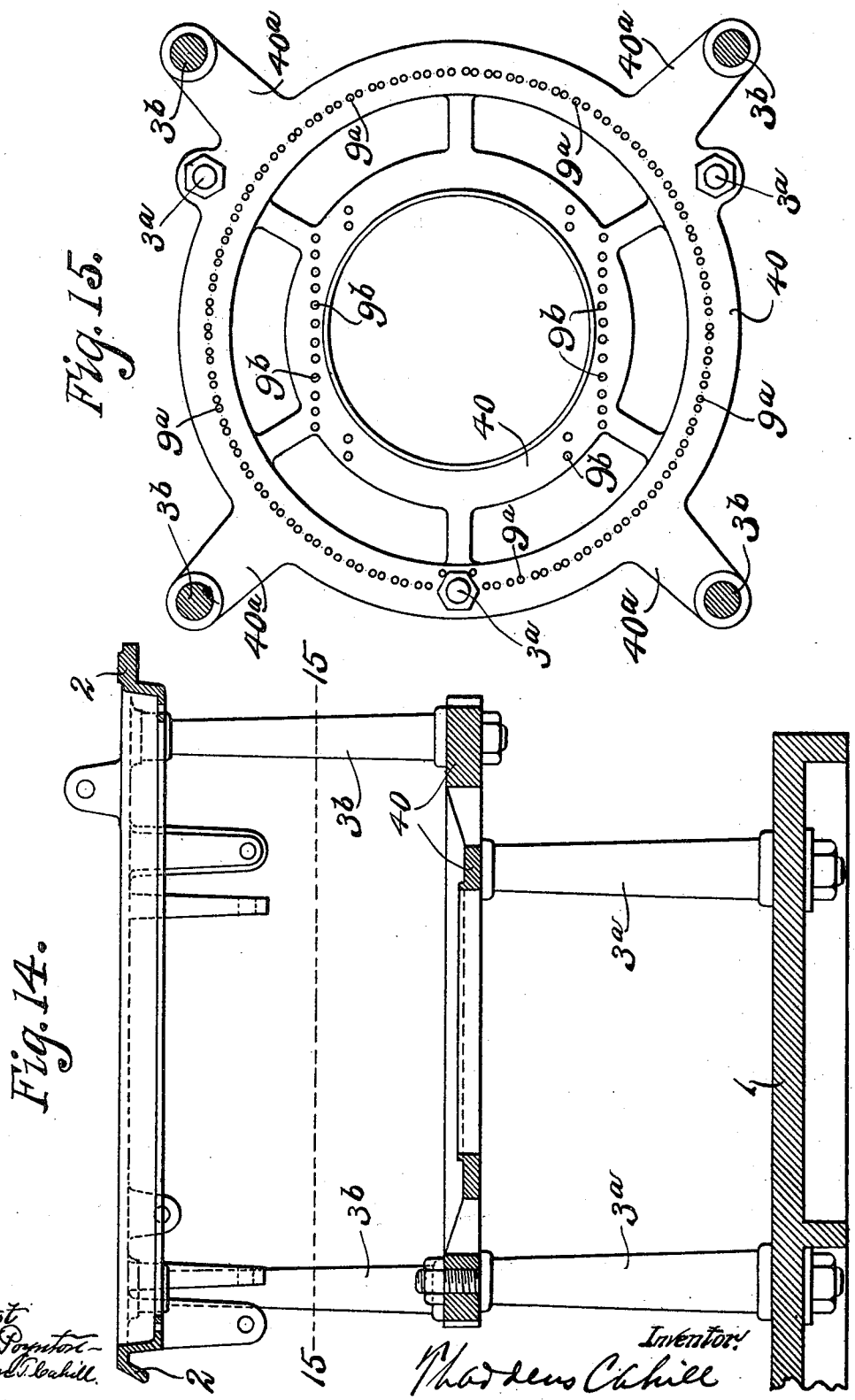

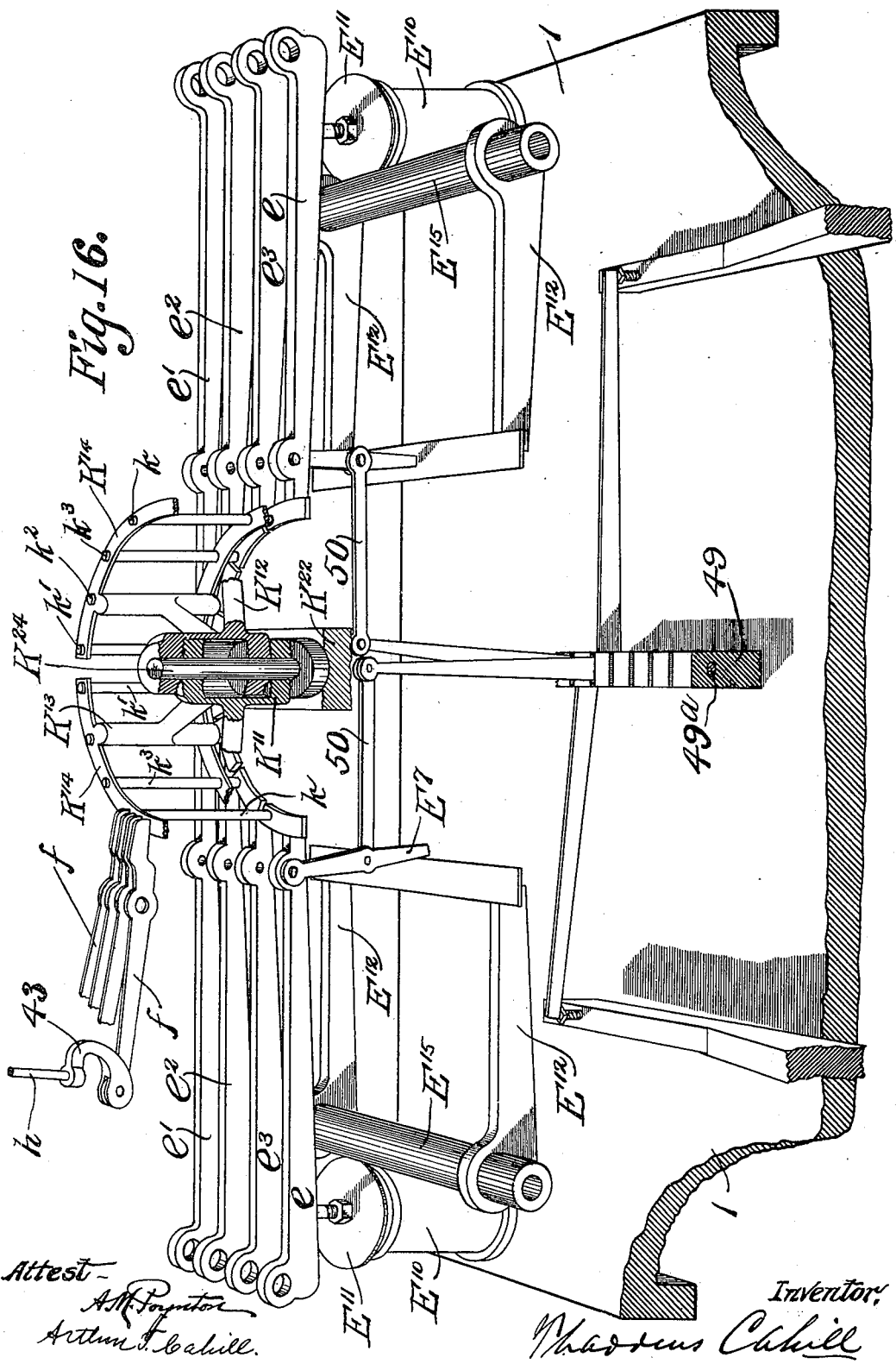

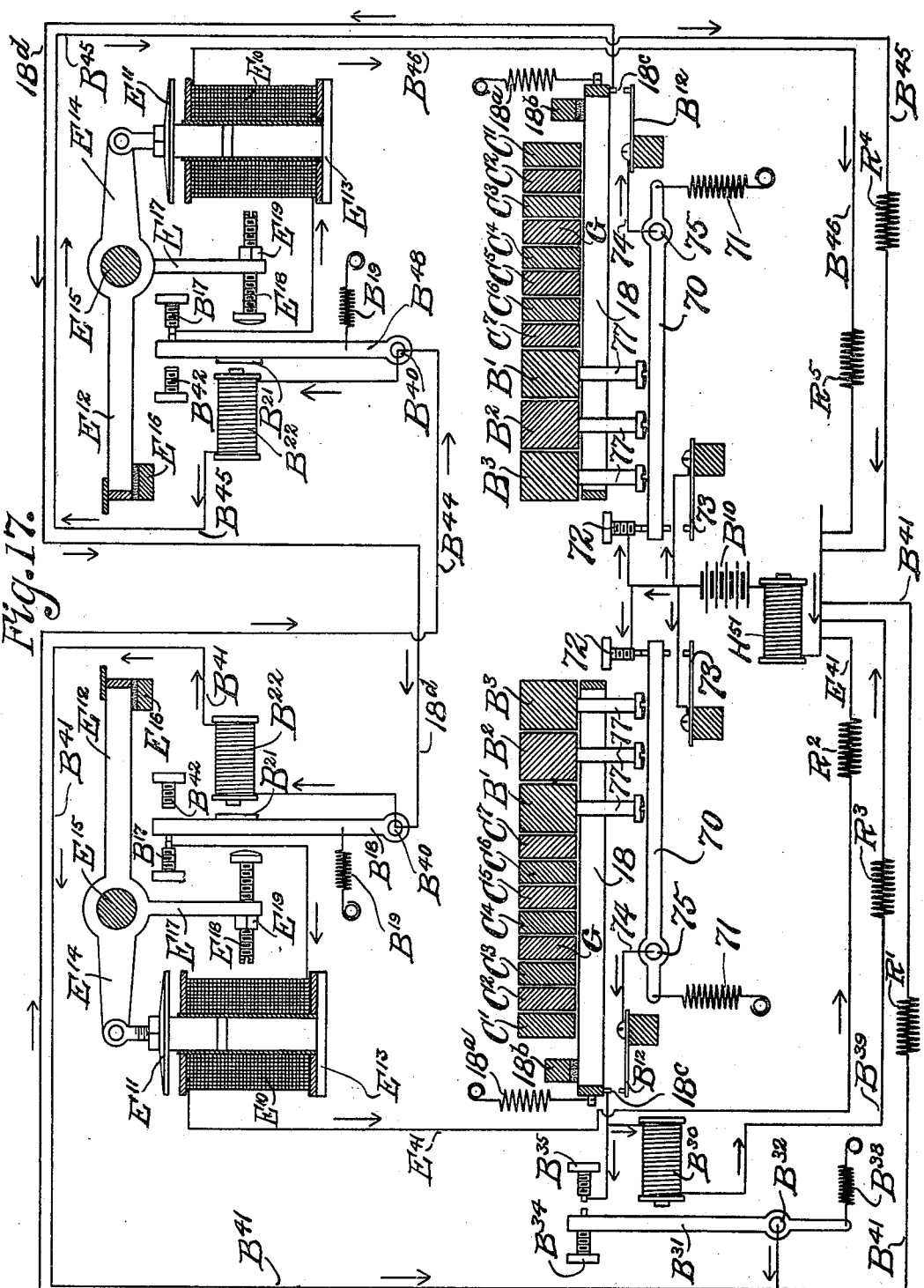

United States Patent Office.

THADDEUS CAHILL, OF WASHINGTON, DISTRICT OF COLUMBIA, ASSIGNOR TO JAMES B. LAMBIE, E. HILTON JACKSON, GEORGE FREDERICK CAHILL, AND ARTHUR T. CAHILL, TRUSTEES.

TYPE-WRITING MACHINE.

SPECIFICATION forming part of Letters Patent No. 654,133, dated July 24, 1900.

Application filed February 1, 1898. Serial No. 668,737. (No model.)

*To all whom it may concern:*

Be it known that I, THADDEUS CAHILL, a citizen of the United States, residing in the city, county, and State of New York, temporarily residing at Washington, in the District of Columbia, have invented certain new and useful Improvements in Type-Writing Machines and other Similar Instruments, of which the following is a specification.

My invention is designed, primarily, for type-writing machines; but certain important features of my invention, hereinafter described and claimed, may be used in other instruments—such, for example, as linotype and other type-setting machines.

I shall first describe my invention as applied to a type-writing machine and will then call attention to certain features of the invention which may be used in other similar instruments, such as linotype-machines, type-composing machines, and other keyboard printing instrumentalities.

My present invention as applied to a type-writing machine is an improvement upon the type-writing machines heretofore invented by me and described in divers patents and pending applications, and particularly it is an improvement upon the type-writing machine illustrated in the drawings of my pending application, Serial No. 641,518, filed June 19, 1897, and described in the specification of said application, (and which application has issued since the filing of this application as Letters Patent No. 604,001, dated May 10, 1898.)

The principal object of my invention is to make a type-writing machine capable of writing two letters at a time, with a small number of keys controlling all the characters, as simple in construction, durable, rapid, and reliable in operation as possible; and my invention consists in the novel combinations hereinafter described, and particularly set forth in the statement of claim at the end hereof.

Figure 1:
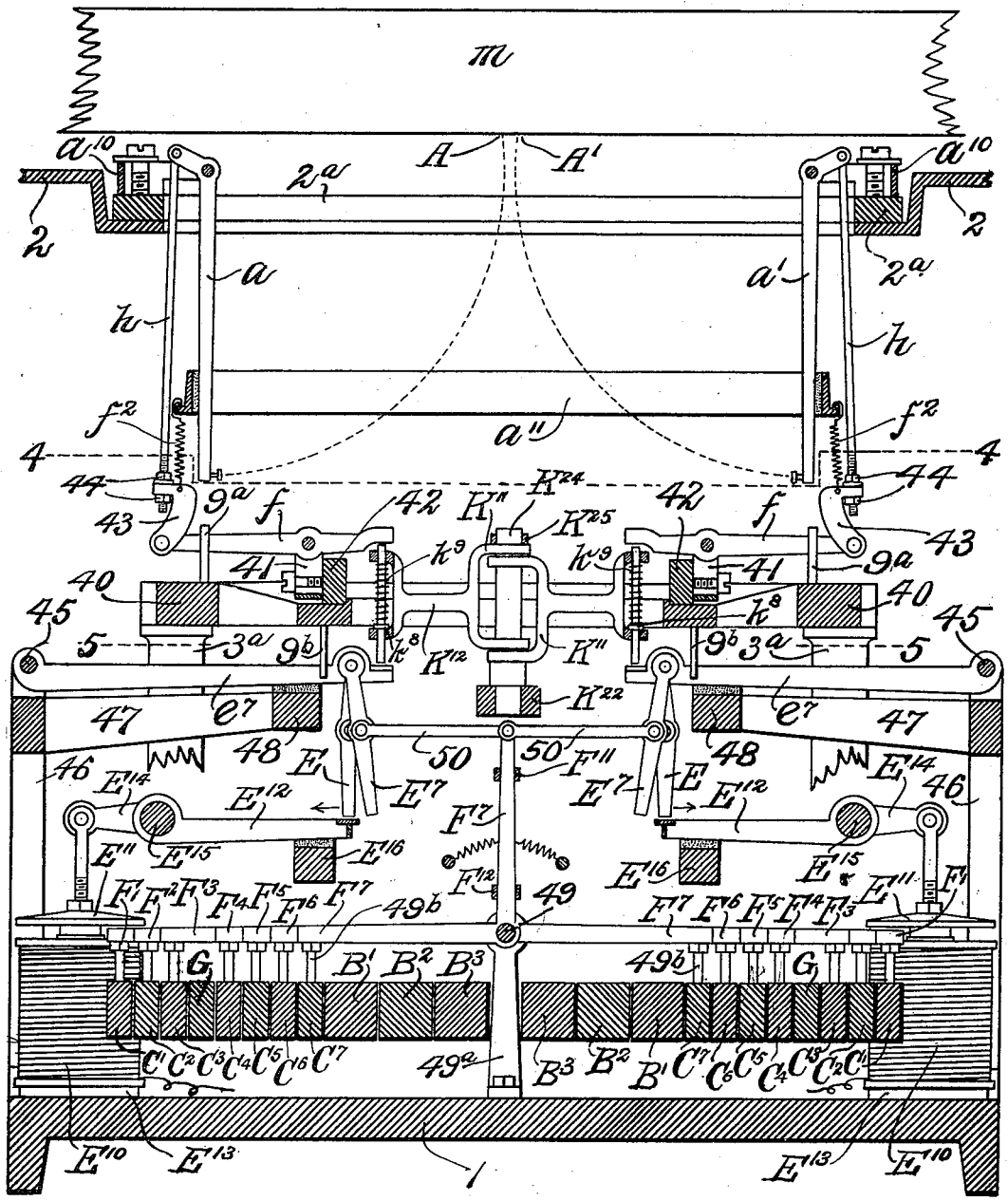
Figure 1A:
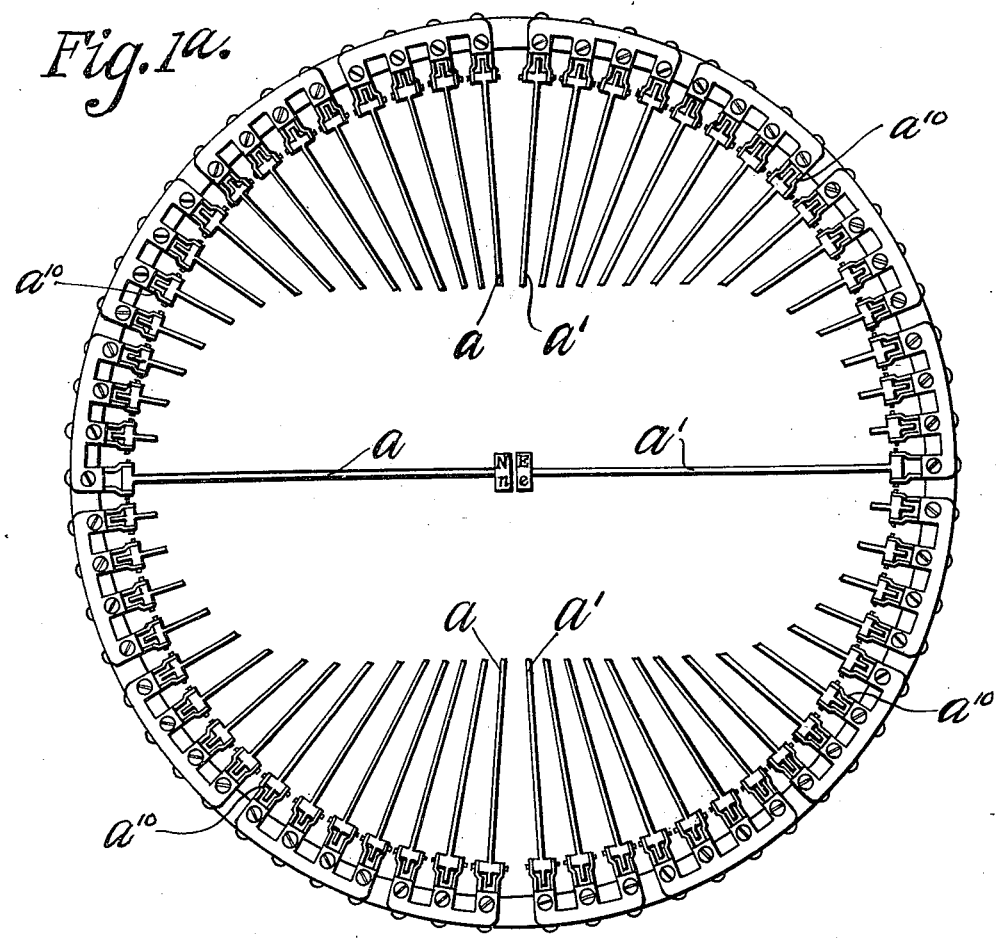
Figure 1B:
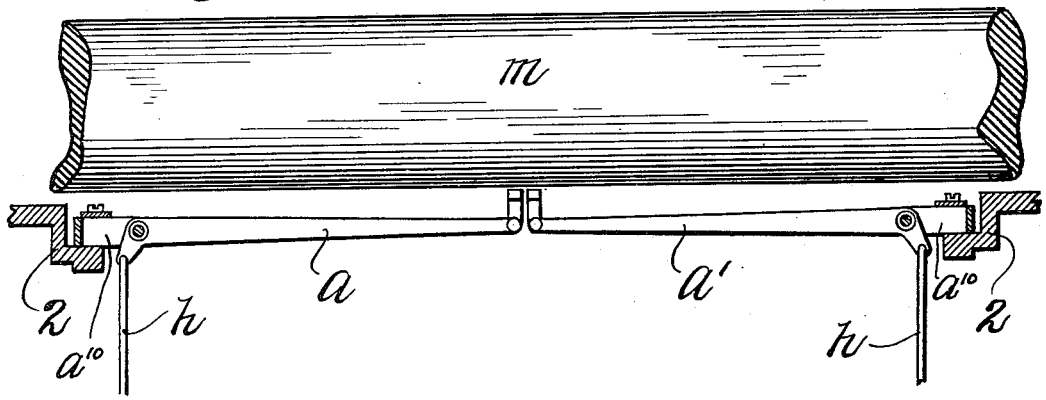

My present machine, like that described in the specification of the application above mentioned, Serial No. 641,518, consists, essentially, of (A) two sets of type-bars, the type-bars of each set striking to a printing-point common to the type-bars of such set, the printing-points of the two sets of type-bars being preferably distinct from but adjacent to each other, as clearly illustrated in Figures 1 and 1ª; (B) two type-bar-selecting devices, one for operating each set of type-bars, each of said type-bar-selecting devices including (*a*) a single motor device acting to impel all the type-bars of the set to which it corresponds, each type-bar as required, (*b*) keys, less in number than the type-bars of the set controlled by such keys, and (*c*) means controlled by said keys, whereby the type-bars are connected with the motor device aforesaid each as required; (C) a paper-carriage, which may be of any suitable kind or construction; (D) spacing mechanism, hereinafter fully described, and (E) the usual minor details and auxiliary parts, such as the interlineary-spacing devices, the ribbon and ribbon-feeding mechanism, the alarm-bell, &c., all of which may be of any suitable kind, and of each of which several varieties are known in the art, and which, as they form no part of my present invention, I shall not burden this specification with any description of them, nor have I illustrated them in any of the drawings.

Without making any statement of claim in this place, and referring the reader for a statement of claim to the paragraphs of claim at the end hereof, I would say, by way of introduction, that the novelty of the present invention as applied to a type-writing machine relates principally (*a*) to certain improvements in the type-bar-selecting mechanism and in the arrangement of the parts whereby the application of power from a motor device to the type-bar impelled by it is made more direct, the construction of the parts simplified, and the whole machine made more compact, simple, strong, and durable; (*b*) to certain improvements in the type-bar-selecting mechanism, (but which are applicable also to shifting devices, whether of the type-bar-selecting variety or of any other, in a type-writing machine, type-composing machine, or other similar key-operated instrument,) whereby the acting of a motor device while the shifting is taking place is prevented; (*c*) to certain other improvements whereby the pin-carrier or other shifter movement-transmitting pins or other shiftable connections are arrested in the exact positions required by means of stop mechanism controlled by one or more of the keys at the keyboard, and (d) to certain improvements in the means for stopping the motor device and permitting the type-bar to return to its normal position in advance of the release of the key controlling it, whereby an easier and more perfect adjustment and a more certain and reliable action of the parts are insured.

Figure 5:
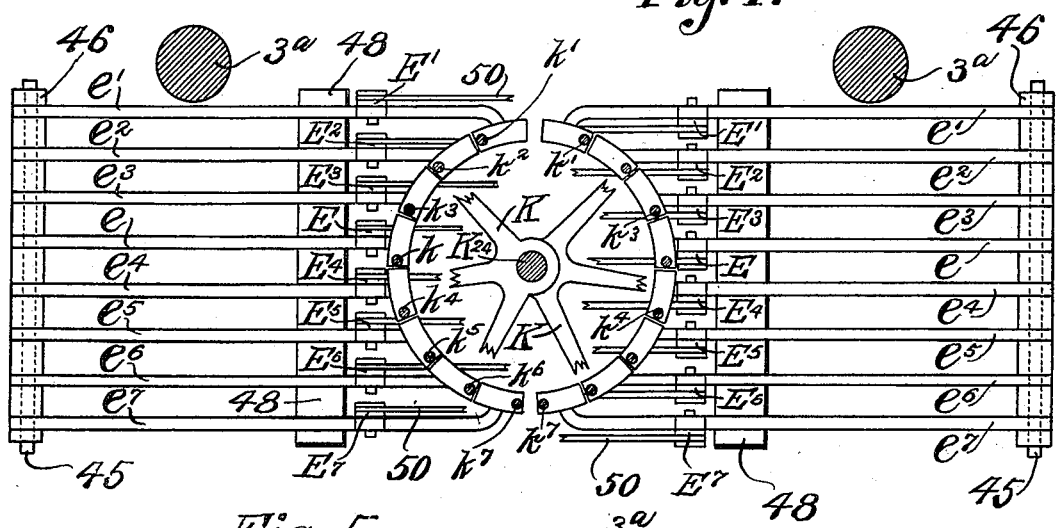
Figure 8:
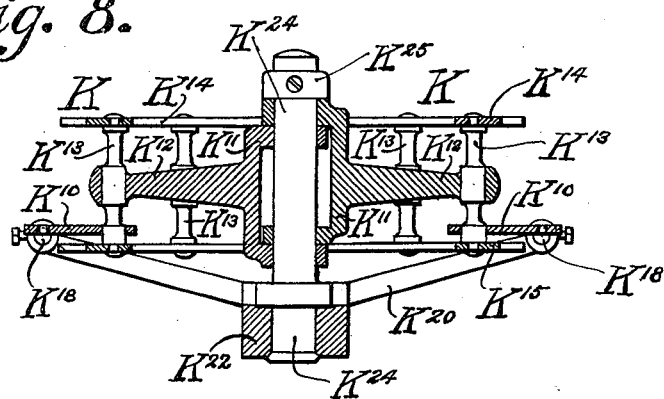
Figure 7:
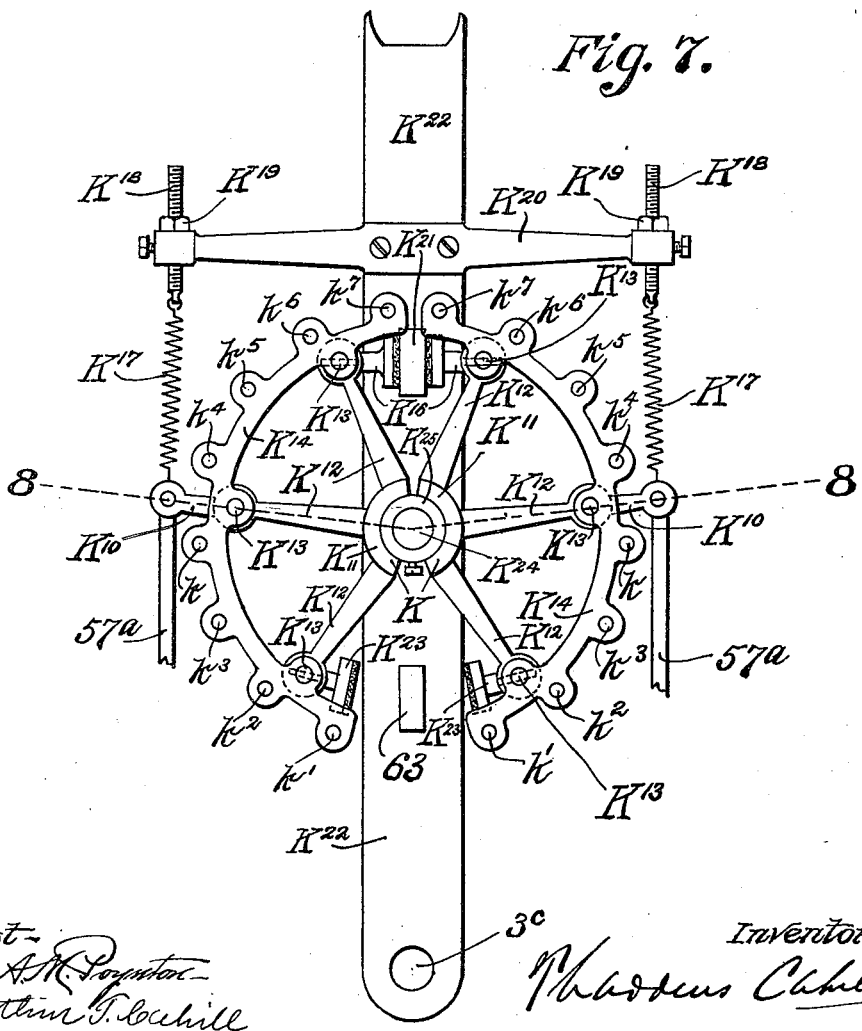
Figure 9:
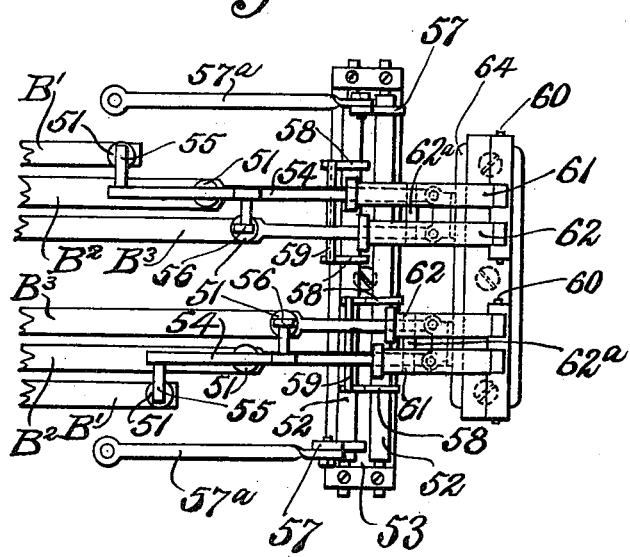
Figure 12:
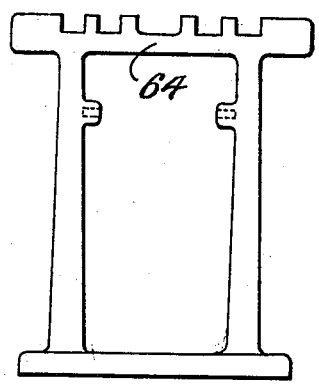
Figure 10:
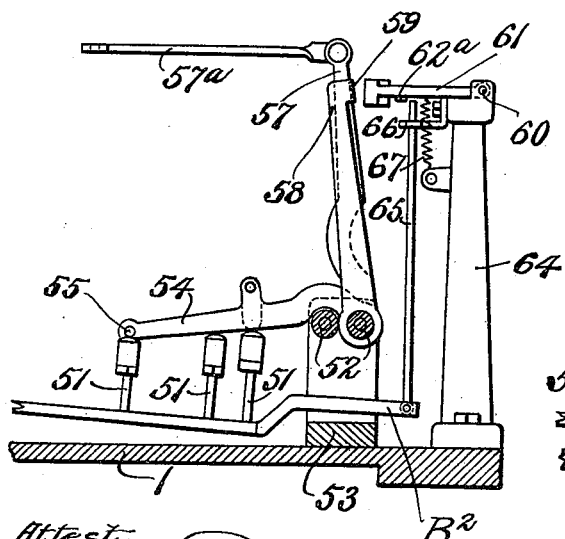
Figure 11:
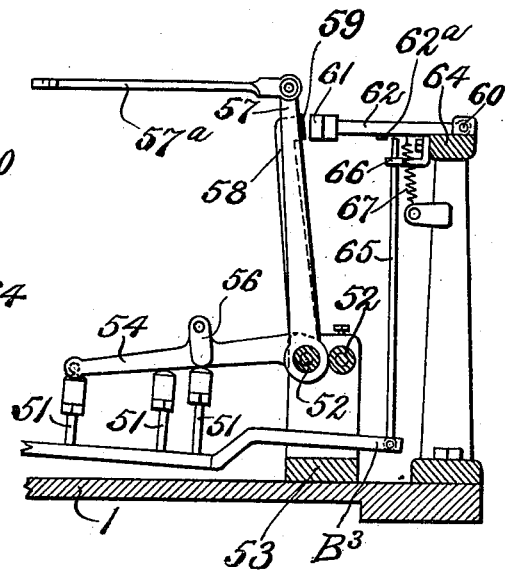
Figure 13:
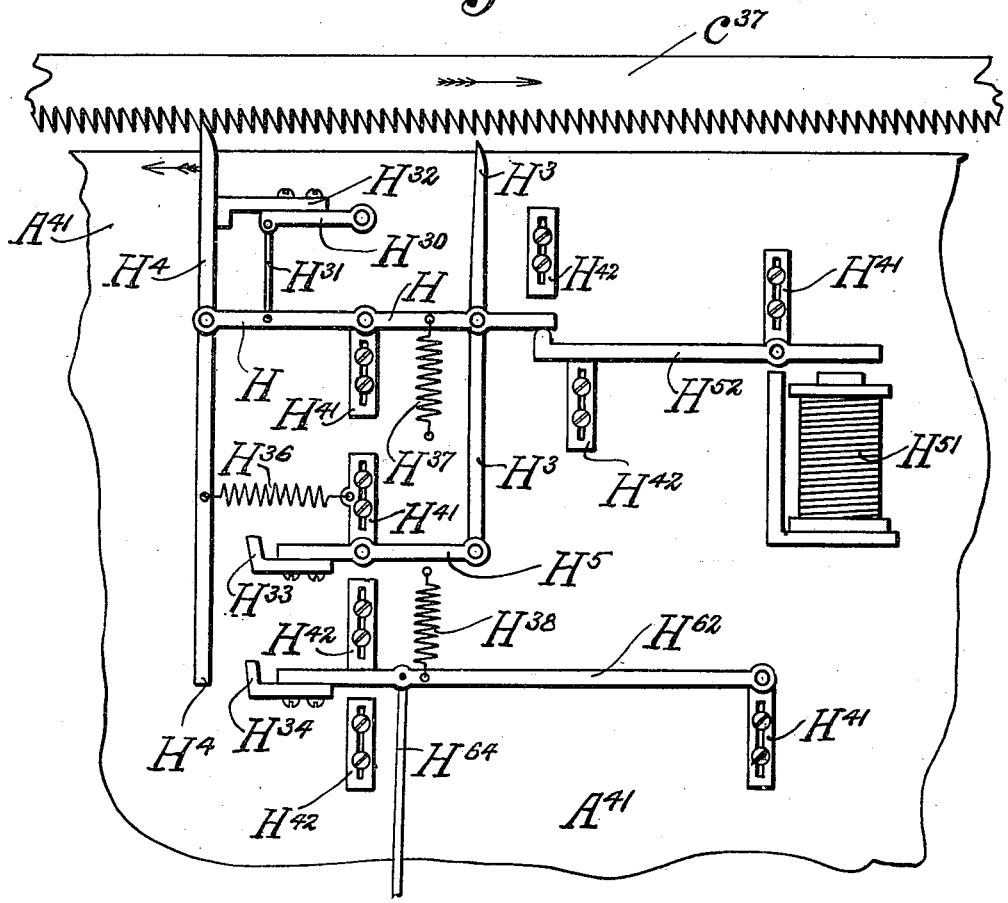

In the accompanying drawings, Figure 1 is a sectional view, partly in elevation, through a type-writing machine constructed according to my invention, the plane of section being transverse to the keys and parallel with the length of the platen or paper-roll. Fig. 1$^a$ is a detail plan view illustrating the two sets of type-bars hereinafter described. Fig. 1$^b$ is a detail view, partly in section, partly in elevation, illustrating two type-bars, belonging one to the right-hand-controlled set and the other to the left-hand-controlled set, striking simultaneously to their respective printing-points. Fig. 2 is a detail sectional elevation in a plane parallel to the plane of Fig. 1, but nearer to the front of the machine, illustrating certain portions of the mechanism not appearing in or omitted from Fig. 1. Fig. 3 is a sectional view, partly in elevation, in a plane transverse to the plane of the preceding figures, illustrating certain positions of my type-writing machine. Fig. 4 is a detail sectional view on the line 4 4, Fig. 1, partly in elevation, illustrating (a) the two sets of radially-disposed levers corresponding, respectively, to and connected, respectively, with the different type-bars of the two sets and (b) the two sets of group-controlling levers, as $e' e^2 e^3$, &c., with the two sets of pins $k' k^2 k^3$, &c., and the carriers K K, wherein said pins are mounted to oscillate intermediate the group-controlling levers $e' e^2 e^3$, &c., and the radially-disposed type-bar-connected levers $f f$, aforesaid, the group-controlling levers $e' e^2 e^3$, &c., being in part broken away. Fig. 5 is a detail sectional view on the line 5 5, Fig. 1, illustrating the two sets of group-controlling levers $e' e^2 e^3$, &c., $e' e^2 e^3$, with their ends made segmental and arranged arc fashion, with the pins controlled by said group-controlling levers seen in section in their normal positions, the pin-carriers K K being seen in plan, but partly broken away. Fig. 6 is a plan view showing the two sets of keys and certain other parts of the mechanism, the columns $3^a 3^a 3^a$, that support the central ring, hereinafter described, being seen in section, as also the vertical arms of the bell-cranks $F' F^2 F^3$, &c., controlled by the two sets of keys, and in this figure the circuit-closing frames 18 18 and the rock-shaft $H^{61}$, with its arms $H^{60} H^{60}$ and $H^{63}$, operated by the space-keys G G, are shown in dotted lines as they lie underneath the keys. The rock-shaft $H^{61}$, indeed, with its arms $H^{60} H^{60}$ and $H^{63}$, lies underneath the bed-plate, as well as underneath the keys. Fig. 7 is a detail, a plan view, of the oscillating segmental pin-carriers and the means by which they are mounted and by which they are arrested in their normal and in their extreme positions. Fig. 8 is a detail, a sectional view, partly in elevation, on the line 8 8, Fig. 7. Figs. 9, 10, 11, and 12 are detail views illustrating the driving mechanism for the oscillating segmental pin-carriers, shown in plan in Fig. 7, with a portion of the stop mechanism therefor. Fig. 9 is a top view. Fig. 10 is a side elevation, partly in section, illustrating the right-hand-controlled driving and stop mechanism that serves for the left-hand one of the carriers K K. Fig. 11 is a similar view illustrating the left-hand-controlled driving and stop mechanism that serves for the right-hand one of the carriers K K; and Fig. 12 is an elevation illustrating the casting or standard 64, which supports the rod that serves as a pivot for the stops 61 and 62, hereinafter described. Fig. 13 is a detail, a rear elevation, partly in section, illustrating the spacing mechanism. Fig. 14 is a longitudinal vertical section, partly in elevation, illustrating the general construction of the more important portions of the main frame. Fig. 15 is a detail, partly in section, partly in plan, on the line 15 15, Fig. 14. Fig. 16 is a perspective detail illustrating certain portions of the mechanism hereinafter described; and Fig. 17 is a diagrammatic detail view, partly in section, partly in elevation, illustrating the arrangement of the electrical circuits.

In all the drawings I endeavor to show the essential parts of the device and the essential features of the invention rather than those minor details of construction which belong solely to mechanical skill and which every constructor varies within wide limits to suit his own ideas. In many of the figures some of the parts that would appear in a geometrical projection are omitted, either to expose other parts to view or to avoid obscuring the drawings with a multiplicity of lines. Some of the figures, indeed, are quite diagrammatic, showing rather the idea and principle of construction than the mechanical details of it. This is particularly true of Figs. 16 and 17.

*Of the main frame.*—The principal portions of the main frame, as illustrated in the drawings, (see particularly Figs. 14 and 15,) are (a) a bed-plate 1, (b) a top plate 2, and (c) a central ring 40, supported by three columns $3^a 3^a 3^a$, rising from the bed-plate, said ring having projections $40^a 40^a 40^a 40^a$, carrying four other columns $3^b 3^b 3^b 3^b$, which rise to support the top plate 2.

*Of the two sets of type-bars,* (see Figs. 1, 1$^a$, and 1$^b$.)—To the top plate 2 is attached by screws a ring $2^a$, to which the hangers $a^{10} a^{10}$ of the type-bars $a a a' a'$ are attached by screws in the usual fashion. There are two sets of type-bars. The bars of the one set (marked $a a$) strike to the printing-point A, Fig. 1. The bars of the other set (marked $a' a'$) strike to the adjacent printing-point A'.

*Of the permutational type-bar-selecting devices,* (see Figs. 1, 2, 3, 4, 5, 6, 7, and 8.)—

There are two of these devices, one for operating the set of type-bars $aa$ and the other for operating the set of type-bars $a'a'$. The two permutational type-bar-selecting devices are similar one to another, so that a description of one is a description of both. Let us first describe the permutational type-bar-selecting device to which the right-hand set of keys belongs and which operates the set of type-bars $aa$, occupying the leftmost half of the type-bar circle. The principal parts of this device are as follows, to wit:

(a) A set of levers $fff$, &c., corresponding to the type-bars $aa$. Said levers $ff$ are fulcrumed by means of hangers 41 41, screwed fast to the fulcrum-ring 42, which latter is screwed fast to the central ring 40, and each of said levers $ff$, &c., is connected by a coupling 43 and a pull-down wire $h$ with the corresponding type-bar $a$. The lower end of the pull-down wire $h$ is threaded and passes through a non-threaded hole in the horizontal arm of the coupling 43, being adjustable therein by means of two lock-nuts 44 44, lying one above and the other below said horizontal arm of the coupling 43. Guide-pins $9^a$ $9^a$, set in the central ring 40, serve to keep the levers $ff$, &c., in their proper radial positions. Contractile springs $f^2 f^2$, each having one end attached to the corresponding coupling 43 and the other end attached to a shelf formed on the type-bar stop-ring $a^{11}$, serve to hold the levers $ff$, &c., and the type-bars connected therewith in their normal positions, with the type-bars resting against the felted interior of the type-bar stop-ring $a^{11}$.

(b) A motor device acting to impel all the type-bars of a set each type-bar as required. The form of motor device that I prefer to use is an electromagnet, as $E^{10}$ in the drawings, having a soft-iron core $E^{13}$ and a soft-iron armature $E^{11}$, connected to the arm $E^{14}$ of the motor-frame $E^{12}$, which latter is centered at $E^{15}$ (by means of steel centers $E^{21}$ $E^{22}$, supported, respectively, by the standards $E^{23}$ and $E^{24}$, which rise from the bed-plate 1) and rests normally down upon the felted stop-bar $E^{16}$; but most obviously any other suitable form of electromagnet might be used instead of that shown, and, further, some other form of motor device—not being an electromagnet—could doubtless be substituted (with corresponding variations in other parts of the device) for the electromagnet shown.

(c) A plurality of group-controlling levers, as $e$, $e'$, $e^2$, $e^3$, $e^4$, $e^5$, $e^6$, and $e^7$, each adapted to control a different group of the levers $ff$ and the type-bars connected therewith. The group-controlling levers $e$ $e'$ $e^2$, &c., are centered by means of a rod 45, set in the casting 46, which is screwed to the bed-plate and is milled out to receive the different levers $e$ $e'$ $e^2$, &c. The free ends of the levers $e$ $e'$ $e^2$, &c., are furnished with segmental pieces, all of which taken together constitute a semicircle, as shown in Fig. 5, corresponding to the semicircle which the inner ends of the radially-disposed levers $ff$ (connected with and corresponding to the type-bars $aa$) form, all of which clearly appears in the drawings. Arm 47, extending from the casting 46 toward the center of the machine, supports a bar 48, on which the group-controlling levers $e$ $e'$ $e^2$, &c., normally rest.

(d) A plurality of pins $k$, $k'$, $k^2$, $k^3$, $k^4$, $k^5$, $k^6$, and $k^7$, (with the semicircular carrier K, wherein said pins are mounted,) corresponding, respectively, to the group-controlling levers $e$, $e'$, $e^2$, $e^3$, $e^4$, $e^5$, $e^6$, and $e^7$ aforesaid. Each of said pins lies above the segmental part of the group-controlling lever which corresponds to it and below the levers $ffff$, controlled by such group-controlling lever, and traverses over its own group-controlling lever to bring the same into operative relation with the different levers $ff$, &c., of the group controlled by it and serves to transmit movement from such group-controlling lever to the proper one of the levers $ffff$. Each of the pins $k$, $k'$, $k^2$, $k^3$, $k^4$, $k^5$, $k^6$, and $k^7$ slides freely in the direction of its own length in the carrier K and is furnished with a collar $k^8$ and an expansive spring $k^9$, whereby the pin is held in and returned to its normal position, with the collar $k^8$ resting down upon the lower flange of the carrier K.

(e) Connections hereinafter described between the group-controlling levers $e$, $e'$, $e^2$, $e^3$, $e^4$, $e^5$, $e^6$, and $e^7$ and the motor-frame $E^{12}$, controlled by a group of keys, as $C'$, $C^2$ $C^3$, $C^4$, $C^5$, $C^6$, and $C^7$, adapted to be operated by the fingers (as distinguished from the thumb) of one hand of the operator, whereby the group-controlling levers $e$ $e'$ $e^2$, &c., are connected, each as required, with the motor-frame $E^{12}$ and motor-magnet $E^{10}$.

(f) Means controlled by a group of keys, as $B'$, $B^2$, and $B^3$, adapted to be operated normally and conveniently by the thumb of one hand, whereby the carrier K is shifted to bring the pins $k'$ $k^2$ $k^3$, &c., (each of which, it will be understood, remains always in operative relation with the corresponding group-controlling levers $e'$ $e^2$ $e^3$, &c.,) into operative relation each to the different levers $ffff$ of the groups controlled by them, thereby to connect the different type-bars of the corresponding groups with the motor device aforesaid.

(g) Means hereinafter described whereby the type-bar-impelling motor is prevented from acting to impel a type-bar while the movement-transmitting pins $k$ $k'$ $k^2$ $k^3$, &c., (or any other shiftable connections that may be used) with the pin-carrier K or other shifter are being positioned.

(h) Stopping means controlled by the keys, as hereinafter described, whereby the pin-carrier K with the movement-transmitting pins $k$ $k'$ $k^2$ $k^3$, &c., (or any other shifting mechanism that may be used instead thereof) are arrested in the positions required.

(i) Means hereinafter described whereby the power is cut off from the type-bar-impelling motor device as the type-bar moves toward the printing-point, so that said type-bar-impelling motor stops and permits the type-bar also to return toward its normal position in advance of the release of the key controlling it.

The connections between the different group-controlling levers $e$ $e'$ $e^2$, &c., and the motor-frame $E^{12}$, which connections are controlled by the keys $C'$, $C^2$, $C^3$, $C^4$, $C^5$, $C^6$, and $C^7$, are as follows, to wit: To the group-controlling levers $e$, $e'$, $e^2$, $e^3$, $e^4$, $e^5$, $e^6$, and $e^7$, respectively, are pivoted push-pieces E, E', $E^2$, $E^3$, $E^4$, $E^5$, $E^6$, and $E^7$, respectively, of which the push-piece E lies normally over the motor-frame $E^{12}$ in such a position that said frame cannot be moved positively without moving the push-piece E and the group-controlling lever $e$, with which it is connected, while the other push-pieces E', $E^2$, $E^3$, $E^4$, $E^5$, $E^6$, and $E^7$ lie normally clear of said motor-frame $E^{12}$, so that said frame can move without affecting them. When moved from its normal position, the push-piece E moves away from the motor-frame $E^{12}$ to escape being moved thereby, while the push-pieces E', $E^2$, $E^3$, $E^4$, $E^5$, $E^6$, and $E^7$ each when moved from its normal position moves over said motor-frame $E^{12}$ into operative relation therewith, so that it is moved thereby. Pivoted upon rod 49 (which rod passes through a hole drilled in the bar $49^a$, which bar is milled out to receive the bell-cranks hereinafter described) is a set of bell-cranks F', $F^2$, $F^3$, $F^4$, $F^5$, $F^6$, and $F^7$, which correspond, respectively, with the keys $C'$, $C^2$, $C^3$, $C^4$, $C^5$, $C^6$, and $C^7$ and with the group-controlling levers $e'$, $e^2$, $e^3$, $e^4$, $e^5$, $e^6$, and $e^7$, and each of said bell-cranks has its horizontal arm overlying an adjustable screw $49^b$, carried by one of the keys aforesaid, while its vertical arm is connected by a link 50 with one of the push-ups, E', $E^2$, $E^3$, $E^4$, $E^5$, $E^6$, or $E^7$, as the case may be, connected with the corresponding group-controlling lever $e'$, $e^2$, $e^3$, $e^4$, $e^5$, $e^6$, or $e^7$, as the case may be. In a word, the bell-cranks F', $F^2$, $F^3$, $F^4$, $F^5$, $F^6$, and $F^7$, respectively, with their links 50 50, &c., are connections interposed between the keys $C'$, $C^2$, $C^3$, $C^4$, $C^5$, $C^6$, and $C^7$, respectively, and the push-pieces E', $E^2$, $E^3$, $E^4$, $E^5$, $E^6$, and $E^7$, respectively, whereby each of the keys $C'$, $C^2$, $C^3$, $C^4$, $C^5$, $C^6$, and $C^7$, respectively, when depressed throws the push-piece F', $F^2$, $F^3$, $F^4$, $F^5$, $F^6$, or $F^7$, as the case may be, connected with the group-controlling lever $e'$, $e^2$, $e^3$, $e^4$, $e^5$, $e^6$, or $e^7$, as the case may be, corresponding to it, over the motor-frame $E^{12}$, so that (the circuit of the motor-magnet $E^{10}$ being closed at the same time, by means hereinafter fully described) said motor-frame gives movement to the group-controlling lever $e'$, $e^2$, $e^3$, $e^4$, $e^5$, $e^6$, or $e^7$ corresponding to the finger-key $C'$, $C^2$, $C^3$, $C^4$, $C^5$, $C^6$, or $C^7$, as the case may be, depressed. The effect, then, of depressing the key $C'$ is to connect the group-controlling lever $e'$ with the motor-frame $E^{12}$ and motor-magnet $E^{10}$, so that it receives movement therefrom. The key $C^2$ when depressed connects the group-controlling lever $e^2$ with the motor-frame $E^{12}$ and motor-magnet $E^{10}$, and so, in like manner, the keys $C^3$, $C^4$, $C^5$, $C^6$, and $C^7$, respectively, when depressed connect the group-controlling levers $e^3$, $e^4$, $e^5$, $e^6$, and $e^7$, respectively, with said frame $E^{12}$ and motor-magnet $E^{10}$, so that movement is given by them to the group-controlling lever connected with them. The arrangement of the circuits, whereby the keys control the motor-magnet $E^{10}$, will be described hereinafter. It is sufficient here to emphasize the fact that the depressing of any of the finger-keys $C'$, $C^2$, $C^3$, $C^4$, $C^5$, $C^6$, and $C^7$ by the operator causes the corresponding group-controlling lever $e'$, $e^2$, $e^3$, $e^4$, $e^5$, $e^6$, or $e^7$ to be connected with the motor-frame $E^{12}$ and motor-magnet $E^{10}$, so that movement is imparted by said motor-magnet $E^{10}$ and motor-frame $E^{12}$ to the group-controlling lever thus connected with them.

It has already been remarked that while the push-pieces E', $E^2$, $E^3$, $E^4$, $E^5$, $E^6$, and $E^7$ corresponding to and connected, respectively, with the group-controlling levers $e'$, $e^2$, $e^3$, $e^4$, $e^5$, $e^6$, and $e^7$, on the one hand, and the keys $C'$, $C^2$, $C^3$, $C^4$, $C^5$, $C^6$, and $C^7$, on the other hand, lie normally clear of the motor-frame $E^{12}$ the push-piece E, connected with the group-controlling lever $e$, (which I shall sometimes term hereinafter the "normal" group-controlling lever,) lies normally over the motor-frame $E^{12}$. In other words, while the push-pieces E', $E^2$, $E^3$, $E^4$, $E^5$, $E^6$, and $E^7$, with the corresponding group-controlling levers $e'$, $e^2$, $e^3$, $e^4$, $e^5$, $e^6$, and $e^7$, are normally disconnected from the motor-frame $E^{12}$ the push-piece E and group-controlling lever $e$ are normally connected with the motor-frame $E^{12}$ aforesaid and the motor-magnet $E^{10}$; but when any of the bell-cranks F', $F^2$, $F^3$, $F^4$, $F^5$, $F^6$, or $F^7$ is moved by the corresponding key $C'$, $C^2$, $C^3$, $C^4$, $C^6$, and $C^7$ to throw the corresponding push-piece E', $E^2$, $E^3$, $E^4$, $E^5$, $E^6$, and $E^7$ over the motor-frame $E^{12}$, thereby to connect the corresponding group-controlling lever $e'$, $e^2$, $e^3$, $e^4$, $e^5$, $e^6$, or $e^7$, as the case may be, with said motor-frame, said bell-crank gives movement to a frame F, (composed of vertical arms F F, centered on the rod 49 aforesaid and firmly connected by transverse bars or members $F^{11}$ and $F^{12}$,) which lies transverse to all the bell-cranks F', $F^2$, $F^3$, $F^4$, $F^5$, $F^6$, and $F^7$ of a set. The frame F when thus moved communicates movement by a link 50 to the push-piece E, moving said push-piece in the direction of the arrow, Fig. 1, away from the motor-frame $E^{12}$, so that it is disconnected therefrom. The function of the normal bell-crank $e$, with its push-piece E and the frame F, will appear clearly hereinafter.

*Of the construction of the pin-carriers K K and the mechanism for shifting them.*—There are two pin-carriers K K, lying normally in the positions illustrated in Figs. 4 and 7. The two pin-carriers are substantially alike, so that a description of one is a description of both. As I have constructed them each consists of (*a*) a cast hub K$^{11}$, with radial spokes K$^{12}$ K$^{12}$ K$^{12}$ integral therewith, (*b*) steel pins K$^{13}$ K$^{13}$ K$^{13}$, set fast in said spokes, and (*c*) an upper flange K$^{14}$ and a lower flange K$^{15}$, both of steel, riveted to the pins K$^{13}$ K$^{13}$ K$^{13}$ aforesaid. The upper and lower flanges K$^{14}$ and K$^{15}$ are drilled to receive the pins $k'$, $k^2$, $k^3$, $k^4$, $k^5$, $k^6$, and $k^7$. To the central one of the pins K$^{13}$ is firmly attached an arm K$^{10}$, to which is connected the mechanism, hereinafter described, by which the carrier is shifted. To one of the spokes K$^{12}$ is attached a stop K$^{16}$ and to another of said spokes is attached a similar stop K$^{23}$. A contractile spring K$^{17}$, having one end attached to the arm K$^{10}$ and the other to a threaded rod K$^{18}$ (adjustable by a nut K$^{19}$) in the cross-bar K$^{20}$, screwed fast to the bar K$^{22}$, serves to hold the carrier K in its normal position, with the stop K$^{16}$, attached to the spoke K$^{12}$, resting against a fixed stop K$^{21}$, which rises from the bar K$^{22}$. The carriers K K oscillate on an axle or center pin K$^{24}$, rising from the bar K$^{22}$. A collar K$^{25}$, secured in place by a set-screw, serves to retain the carriers K K on the axle K$^{24}$. The bar K$^{22}$, to which said axle is attached, is supported in front by the column 3$^a$ and at the rear by the column 3$^c$, rising from the bed-plate. Such are the details of the construction I have followed; but I attach no special importance to them. Any skilled mechanic could vary them as desired. Obviously the carrier might be cast or otherwise formed in one piece instead of being built up in the manner I have described. The reason I have built mine in the way I have described is to combine strength with lightness. The pins $k'$ $k^2$ $k^3$ $k^4$, &c., occupy normally the positions illustrated in Figs. 4 and 5. Each of these pins, it will be remembered, serves to connect the corresponding group-controlling lever $e'$, $e^2$, $e^3$, $e^4$, $e^5$, $e^6$, or $e^7$, as the case may be, with four of the levers $f f f f$, and the pin-carrier shifts or is oscillated on its axle to carry the pins into the proper positions to act upon the different levers $f f f f$ of the corresponding groups. Normally each pin acts on the first member of the group of four type-bar-connected levers $f f$ that it serves to transmit motion to. When moved by the key B', the carrier shifts a distance equal to the distance between two adjacent levers $f f$, so as to bring the pins each under the second lever of its group. When moved by the key B$^2$, the carrier shifts a distance equal to twice that between two adjacent levers $f f$, so that it brings each pin into operative relation with the third lever of the group of type-bar-connected levers $f f$, to which such pins transmit motion, and when the carrier is moved by the depressing of the key B$^3$ it moves a distance equal to three times the distance between the levers $f f$ of the group, so that it brings the pins $k'$, $k^2$, $k^3$, $k^4$, $k^5$, $k^6$, and $k^7$ each into operative relation with the fourth lever of the group controlled by it, and the mechanism for this purpose is as follows: At the back of the machine is a rock-shaft 52, supported by centers set in the casting 53. There are, in fact, two rock-shafts 52 with connected parts, one serving for one of the carriers K and the other serving for the other one of said carriers; but a description of one of said rock-shafts and the parts connected therewith will suffice, since the two are substantially similar, as the drawings show. To the rock-shaft 52 is attached a horizontal arm 54, upon which the key B$^2$ acts through an adjustment-screw 51. Said arm 54 also carries projections 55 and 56, extending upon opposite sides of it, upon which projections the keys B' and B$^3$ respectively act through their adjustment-screws 51 51. (See Figs. 9, 10, and 11.) The leverages are arranged in such a manner that the key B' gives to the arm 54 and the rock-shaft 52 and connected parts a movement of one, while the key B$^2$ gives them a movement of two, and the key B$^3$ gives them a movement of three, to shift the carrier as before described. To the rock-shaft 52 is also attached a vertical arm 57, which is connected by a link 57$^a$ with the arm K$^{10}$ of the corresponding pin-carrier K. To said rock-shaft 52 are also attached two other vertical arms 58 58, which are firmly connected at the top by a transverse bar 59, which serves to engage the escaping-stops 61 and 62, which are fulcrumed upon a rod 60, which rod is supported by a casting or standard 64, (see Figs. 9, 10, 11, and 12,) which casting is milled out to receive the stops 61 and 62. The stop 61 serves to arrest the rock-shaft 52, with its various arms, (54, 57, 58, and 58,) and the carrier K, connected with it by the link 57$^a$, when the key B' is depressed, allowing a movement of the parts sufficient to shift the pins $k'$, $k^2$, $k^3$, $k^4$, $k^5$, $k^6$, and $k^7$ each from operative relation with the first one of the type-bar-connected levers $f f f f$ of the group that it controls into operative relation with the second of said type-bar-connected levers. The stop 62 serves to arrest all said parts when the key B$^2$ is depressed, allowing a movement of the carrier K sufficient to shift the pins aforesaid each into operative relation with the third one of the type-bar-connected levers $f f f f$ in the group controlled by it, and a fixed stop 63, attached to the bar K$^{22}$, Fig. 7, serves to arrest all the parts when the key B$^3$ is depressed, allowing a movement of the carrier K sufficient to shift the pins aforesaid each into operative relation with the fourth one of the type-bar-connected levers $f f f f$ in the group controlled by it. None of the stops is moved when the key B' is depressed; but when the key B$^2$ is depressed said key, acting through the push-up 65, connected with it, (the upper end of which push-up passes through an eye in the guide-piece 66, attached to the standard 64,) lifts the stop 61 out of the way before the part 59 (carried by the arms 58 58 and serving to engage the stops 61 and 62, as above mentioned) reaches it, so permitting all the parts to move until arrested by the part 59 coming in contact with the stop 62, and when the key B³ is depressed it, through a similar push-rod 65, (the upper end of which passes through another eye in the same guide-piece 66, before mentioned,) raises the stop 62 (which has connected with it a projection 62ª, underlying the stop 61, so that when the stop 62 is raised it raises the stop 61 with it) and the stop 61, connected with it, in the manner just described, before the part 59 comes in contact with either of said stops 61 and 62, so that all the parts are left free to move until the stop $K^{23}$, before mentioned, attached to the carrier K, comes in contact with the fixed stop 63, attached to the bar $K^{22}$. In brief, then, the key B' moves the carrier K a sufficient distance to bring the pins $k'$, $k^2$, $k^3$, $k^4$, $k^5$, $k^6$, and $k^7$ each from its normal position of operative relation with the first lever of the group of levers $f f f f$ controlled by it into operative relation with the second of said levers, the key B² brings said pins each into operative relation with the third one of the levers $f f f f$ controlled by it, and the key B³ brings said pins each into operative relation with the fourth one of the levers $f f f f$ of the group controlled by it. The stop 61 serves to arrest the parts when the key B' is depressed. Said stop is moved out of the way and the stop 62 serves to arrest the parts when the key B² is depressed, and both of the stops 61 and 62 aforesaid are lifted out of the way when the key B³ is depressed, and the fixed stop 63 then serves to arrest all the parts.

Contractile springs 67 are used to return the stops 61 and 62 to their normal positions.

The permutational mechanism controlled by the left-hand keys and controlling the set of type-bars $a'$ $a'$ lying on the left-hand side of the center of the machine is in substance identical with the other permutational type-bar-selecting mechanism, already described, controlled by the right-hand keys and controlling the set of type-bars $a$ $a$ lying on the left-hand side of the center of the machine. All this appears so plainly in the drawings that dwelling upon it here would be a mere waste of time. The two sets of type-bars $a$ $a$ and $a'$ $a'$, it will be seen, together form a circle of type-bars, and the two sets of type-bar-connected levers $f f$, &c., belonging one to the right-hand keys and to the type-bars $a$ $a$ and the other to the left-hand keys and the type-bars $a'$ $a'$, also constitute a circle. The right-hand keys, it will be observed, are connected to operate the left-hand set of group-controlling levers $e'$ $e^2$ $e^3$, &c., and the left-hand pin-carrier K, thereby to operate the left-hand set of levers $f f$, &c., and the set of type-bars $a$ $a$ connected therewith, while the left-hand keys are connected to operate the right-hand set of group-controlling levers $e'$ $e^2$ $e^3$, &c., and the right-hand pin-carrier K, thereby to operate the right-hand set of levers $f f$ and the set of type-bars $a$ $a$ connected therewith; but most obviously the right-hand set of keys might be connected to operate the right-hand set of group-controlling levers $e'$ $e^2$ $e^3$, &c., and the right-hand pin-carrier K and the right-hand set of type-bars $a'$ $a'$, the left-hand keys being in such case connected to operate the left-hand set of group-controlling levers $e'$ $e^2$ $e^3$, &c., with the left-hand pin-carrier K and the left-hand set of type-bars $a$ $a$. The advantage of the arrangement illustrated in the drawings results from the fact that the right-hand, which is with most persons the more dexterous of the two, receives the more work, as it takes the initiative, and the most work necessarily falls on the hand which controls the character which prints first, for in every word that contains an odd number of letters such hand has one movement more to make than the other hand.

*Of the arrangement of the electric circuits.*—We are now in a position to trace the electrical circuits. (See particularly Fig. 17.) $B^{10}$ is a battery or other suitable source of electrical current. Underlying all the keys of each set in front of their fulcrums is a circuit-closing frame 18 18, (see Figs. 6 and 17,) said frames being suitably mounted in points or otherwise to oscillate freely a limited distance. Each of said frames is held by a contractile spring 18ª normally in contact with the stop 18ᵇ; but when any key of either set is depressed such key oscillates the frame 18 underlying it, moving said frame until a platinum contact-point 18ᶜ carried by it comes in contact with a similar contact-point set in the spring $B^{12}$. Underlying the thumb-keys B' B² B³ of each set is a metal lever 70, which is centered at 75 and held by a contractile spring 71 normally in contact with the adjustable stop-screw 72 and which is oscillated when any of the keys B', B², or B³ overlying it is depressed from such (its normal) position until it is arrested by the contact-spring 73. The keys B', B², and B³ are furnished with adjustment-screws 77 to act on the lever 70. The positive pole of the battery $B^{10}$ is connected with the contact-screws 72 72 and with the contact-springs 73 73, and each of the levers 70 is connected by a wire 74 with the contact-spring $B^{12}$, with which the circuit-closing frame 18, that is operated by the same set of keys, makes connection. The function of the lever 70 of each set is to prevent the closing of the circuit of the corresponding motor-magnet $E^{10}$ while the corresponding pin-carrier K is being shifted. If the pin-carrier K remains in its normal position, then when one of the finger-keys C', C², C³, C⁴, C⁵, C⁶, or C⁷ (belonging to the set which controls such pin-carrier) is depressed the current flows from the positive pole of the battery $B^{10}$ to the contact-screw 72, thence to the lever 70, and from said lever by the conductor 74 to the contact-spring $B^{12}$; but if any of the thumb-keys $B'$, $B^2$, or $B^3$ be depressed such key at the same time that it depresses the frame 18 to make connection between the contact-point $18^c$ and the contact-spring $B^{12}$ oscillates the lever 70 from its normal position of contact with the screw 72, so that the circuit cannot be closed until said lever comes in contact, at the limit of its movement, with the contact-spring 73. From the contact-point $18^c$ the path of the current on the two sides of the machine is in one respect different. I shall first describe the path of the current flowing from the contact-point $18^c$, carried by the circuit-closing frame 18, that underlies the right-hand keys, and after that will describe wherein the arrangement of the circuits controlled by the left-hand keys differs. To resume, then, from the contact-point $18^c$, carried by the circuit-closing frame 18, that underlies the right-hand keys, the current flows by the conductor $18^d$ to the switch-lever $B^{18}$, to which is attached the soft-iron armature $B^{21}$ of the switch-detent magnet $B^{22}$, and which is centered at $B^{40}$ and held by a contractile spring $B^{19}$ normally in contact with the adjusting-screw $B^{17}$. At the switch-lever $B^{18}$ the current divides, a small portion of it going to the switch-detent magnet $B^{22}$ and thence by the conductor $B^{41}$ (in which is inserted the resistance $R'$) to the space-magnet $H^{51}$, and so back to the negative pole of the battery $B^{10}$, while the principal part of said current flows from the switch $B^{18}$ to the contact-screw $B^{17}$ and thence through the magnet $E^{10}$, controlling the left-hand set of group-controlling levers $e$ $e'$ $e^2$, &c., and the type-bars $a$ $a$, and from said motor-magnet the current flows by the conductor $E^{41}$ (in which is inserted the resistance $R^2$) to the space-magnet $H^{51}$ and through said magnet back to the negative pole of the battery $B^{10}$. The passage of the current through the motor-magnet $E^{10}$ aforesaid causes it to attract its armature $E^{11}$, thereby giving movement to the motor-frame $E^{12}$ connected therewith and to whatever one of the group-controlling levers $e$, $e'$, $e^2$, $e^3$, $e^4$, $e^5$, $e^6$, or $e^7$ may be connected with said motor-frame, and thus to one of the type-bars of the set $a$ $a$. At or about the instant the type-bar strikes the platen (preferably a little before it strikes) the adjustment-screw $E^{18}$, carried by the arm $E^{17}$ of the motor-frame $E^{12}$ and adjustable therein by means of a lock-nut $E^{19}$, strikes the switch $B^{18}$, breaking the circuit of the magnet $E^{10}$ and throwing said switch over toward or against the stop-screw $B^{42}$, against which said switch-lever $B^{18}$ is now firmly held by the switch-detent magnet $B^{22}$, the current through which and the strength of the magnetism of which increases greatly upon the breaking of the parallel circuit of lower resistance through the magnet $E^{10}$ and resistance $R^2$. The circuit of the right-hand-controlled motor-magnet $E^{10}$ being thus broken it loses its magnetism and allows the type-bar $a$, which has just been impelled by it, to return instantly to its normal position whether the key be released or not. When the key or keys depressed of the right-hand set are released, the circuit-closing frame 18 controlled by them returns to its normal position under the influence of the contractile spring $18^a$, moving the contact-point $18^c$ away from the contact-spring $B^{12}$, thereby breaking the circuit of the switch-detent magnet $B^{22}$, which, instantly losing its magnetism, allows the switch-lever $B^{18}$ to return to its normal position under the influence of the contractile spring $B^{19}$.

The circuits controlled by the left-hand keys and controlling the motor-magnet $E^{10}$ that operates the right-hand set of levers $e$ $e'$ $e^2$, &c., with the set of type-bars $a'$ $a'$ corresponding thereto with the switch-detent magnet $B^{22}$, that coöperates with the motor-magnet $E^{10}$ last mentioned, might be made to be exactly like the circuits above described controlled by the right-hand keys; but while I prefer to have the type-bar of the set $a'$ $a'$ that acts simultaneously with one of the type-bars of the set $a$ $a$, strike at about the same instant I prefer also that one of said type-bars (the one belonging to the set $a$ $a$ as things are arranged in the drawings) shall a little precede the other in arriving at the printing-point, that there shall be a phase difference in the movements of the two bars, so that any interference between them as they approach their closely-adjacent printing-points will be avoided. No phase difference, however, is absolutely indispensable, for by leaving the two printing-points A and A' of the two sets of type-bars $a$ $a$ and $a'$ $a'$ a sufficient distance apart the two type-bars can come up at exactly the same instant and with a unison of phase in their movements; but by giving one bar a little lead over the other (in other words, by making the bars of the set $a'$ $a'$ or the motor device controlling them a little slower acting than the bars of the set $a$ $a$ with their motor device, so that when the bars of the two sets operate simultaneously the one will reach the printing-point a little before the other, the bar first to print passing, as it retreats from the printing-point, the bar of the other set approaching its printing-point) it becomes possible to print the letters a little closer together, and a little less allowance may be made for wear. To effect this difference in the phases of movement of the two bars, I arrange matters in such a manner (see Fig. 17) that while the circuits of the motor-magnet $E^{10}$ and switch-detent magnet $B^{22}$, controlled by the right-hand keys, are closed the instant those keys are depressed the circuits of the motor-magnet $E^{10}$ and switch-detent magnet $B^{22}$, controlled by the left-hand keys, are not closed until an instant after such keys are depressed. The path of the current from the positive pole of the battery $B^{10}$ to the platinum contact-point $18^c$, carried by the circuit-closing frame 18, that underlies the left-hand keys, is similar, as the drawings clearly show, to that already described in connection with the right-hand keys; but the current, instead of flowing directly from the contact-point $18^c$ underneath the left-hand keys to the switch-lever $B^{18}$ and motor-magnet $E^{10}$, (as the current controlled by the right-hand keys does,) first flows from said contact-point $18^c$ through the magnet $B^{30}$, and thence by the conductor $B^{39}$ (in which is inserted the resistance $R^3$) to the space-magnet $H^{51}$, and through said magnet back to the negative pole of the battery $B^{10}$. So soon as the magnet $B^{30}$ becomes sufficiently magnetized it attracts its armature $B^{31}$, (which is centered at $B^{32}$ and held by the contractile spring $B^{33}$ normally in contact with the adjustable stop-screw $B^{34}$,) bringing said armature in contact with the screw $B^{35}$, which is also connected with the contact-point $18^c$, controlled by the left-hand keys. The current flowing from the positive pole of the battery $B^{10}$ to said contact-point $18^c$ now divides, a portion of it sufficient to hold the armature $B^{31}$ in contact with the screw $B^{35}$ flowing through the magnet $B^{30}$, as before, while the major portion of the current flows from the lever $B^{31}$ by the conductor $B^{44}$ to the switch $B^{48}$, (centered at $B^{40}$ and held by contractile spring $B^{19}$ normally in contact with the adjustable screw $B^{17}$,) where the current again divides. A portion of it passes to the switch-detent magnet $B^{22}$, and thence by the conductor $B^{45}$ (in which is inserted the resistance $R^4$) to the space-magnet $H^{51}$, and through said magnet back to the negative pole of the battery $B^{10}$, while the major portion of the current that reaches the switch $B^{48}$ passes from said switch to the contact-screw $B^{17}$, and thence to and through the motor-magnet $E^{10}$, controlled by the left-hand keys, and from said magnet by the conductor $B^{46}$ (in which is inserted the resistance $R^5$) to the space-magnet $H^{51}$, and through said space-magnet back to the negative pole of the battery $B^{10}$. When the motor-magnet $E^{10}$, controlled by the left-hand keys, becomes energized by the passage of the current, it attracts its armature $E^{11}$, Figs. 1, 2, 3, and 17, thereby giving movement to the motor-frame $E^{12}$, connected therewith, and to the type-bar connected with said motor-frame. About the instant the type-bar strikes the paper (preferably a little before it) the screw $E^{18}$ (adjustable by means of the lock-nut $E^{19}$, carried by the arm $E^{17}$ of the motor-frame $E^{12}$) strikes the switch $B^{48}$, throwing it from its normal position of contact with the screw $B^{17}$ over toward or against the adjustable stop-screw $B^{42}$, (in which latter position said switch is held by the detent-magnet $B^{22}$ until the keys are released,) thereby breaking the circuit of the motor-magnet $E^{10}$, controlled by the left-hand keys, and leaving the type-bar impelled by said motor-magnet free to return instantly to its normal position, whether the keys controlling it be released or not. So soon as said keys are released the circuit-closing frame 18, depressed by them, rises to its normal position under the influence of its returning spring $18^a$, before mentioned, thereby breaking the connection between the contact-point $18^c$ and the contact-spring $B^{12}$ and rupturing the circuit of the switch-detent magnet $B^{22}$, whereupon the switch-lever $B^{48}$ returns to its normal position and all the parts are in condition for another operation.

*Of the paper-carriage and the spacing mechanism.*—$m$ is the platen or paper-roll. $m'$ is the carriage-frame; $m^2$, the back rod on which the carriage runs, and $m^3$ the frame hinged to the carriage-frame and carrying the space-rack $c^{37}$. The details of the paper-carriage I need not describe. I have used in practice a paper-carriage substantially identical with that used in the machine long well known in the art and trade as the "Remington Standard Type-Writer No. 2;" but as several forms of carriage are well known in the art, and as any suitable carriage may be used, and as my invention does not consist in or specially relate to the construction of the paper-carriage, I shall not burden this specification with a description of unnecessary details, which every constructor varies to suit himself; and so as to the ribbon-feeding mechanism. I have used in practice a ribbon-feeding mechanism substantially like that used in the Remington Standard Type-Writer No. 2 aforesaid; but the ribbon-feeding mechanism forms no part of my invention. Various forms of ribbon-feeding mechanism are well known in the art, and any suitable form of ribbon-feeding mechanism may be used. So as to the alarm-bell, the interlinear spacing mechanism and other minor details. The rack $c^{37}$ then is suitably connected with a suitable paper-carriage, which carriage is urged in the direction of the arrow, Fig. 13, by suitable carriage-motor-spring mechanism. The device which I have used for this purpose is in substance identical with that used in the machine long well known in the art and trade as the "Remington Standard Type-Writer No. 2," aforesaid; but as various forms of carriage-motor-spring mechanism are well known in the art, and as no one of them forms any part of my present invention, and as I have not altered or varied in principle the devices already well known in the art for this purpose, I have not thought it best to burden this specification with any description of the carriage-motor-spring mechanism.

The letter-spacing mechanism is as follows:

H is the dog-carrying lever, which is pivoted by means of a hanger $H^{41}$ and which serves to carry the two dogs $H^3$ and $H^4$, that play alternately into and out of the rack $c^{37}$. Of these $H^3$ is the fast dog—that is to say, the dog that has no movement tangent to the line of movement of the rack $c^{37}$, no movement save in and out of the space-rack—and $H^4$ is the loose dog—that is to say, the dog that has a movement tangent to the line of movement of the rack $c^{37}$, as well as a movement into and out of said rack. In the drawings, $H^{41}$ $H^{41}$ are hangers, and $H^{42}$ $H^{42}$, &c., are adjustable stops for the various parts.

$H^{51}$ is the spacing-magnet, the arrangement of whose circuit is clearly illustrated in Fig. 17, before described, and which, it will be observed, is energized by the passing of the current whenever any key either of the right-hand set or the left-hand set is depressed.

$H^{62}$ is the space-enlarging lever, which carries at its end an adjustable stop $H^{34}$, that serves, normally, to arrest the movement which the loose dog $H^4$ executes in the direction of the arrow, Fig. 13, under the influence of its contractile spring $H^{36}$ when freed from the rack $c^{37}$. Another lever $H^5$ (to which the lower end of the fast dog $H^3$ is pin-jointed) carries another adjustable stop $H^{33}$, which serves to arrest the movement of the loose dog $H^4$ in the direction of the arrow, Fig. 13, when the space-enlarging lever $H^{62}$ is moved from its normal position. Normally the fast dog $H^3$ lies with its point a little below the rack $c^{37}$ and clear of said rack, while the loose dog $H^4$ normally has its point up in the pitch of said rack and is held by the rack (which, it will be remembered, is urged in the direction of the arrow, Fig. 13, by a suitable carriage-motor-spring arrangement, not shown in the drawings) firmly in contact with the adjustable stop $H^{32}$, carried by the lever $H^{30}$, which is connected by a link $H^{31}$ with the dog-carrying lever H.

Let us now consider the operation of the parts when the space-enlarging lever $H^{62}$ lies in its normal position, in which it is shown in Fig. 13. The depressing of any of the keys either of the right-hand or the left-hand set causes the electric current to pass through the space-magnet $H^{51}$ (for the arrangement of whose circuit see Fig. 17) sufficient to energize said magnet, which thereupon attracts its armature $H^{52}$, drawing down that end of said armature which overlies said magnet $H^{51}$, and thereby elevating the other end of said armature, which underlies the dog-carrying lever H, rocking the lever last named, moving the fast dog $H^3$ up into the rack $c^{37}$, and instantly thereafter drawing the loose dog $H^4$ down out of said rack. The carriage now moves a very short distance until it is arrested by the point of the fast dog $H^3$. At the same time the point of the loose dog $H^4$ moves in the direction of the arrow, Fig. 13, under the influence of the contractile spring $H^{36}$ a sufficient distance to clear two of the teeth of the rack $c^{37}$, when the lower end of said dog $H^4$ comes in contact with the stop $H^{34}$, carried by the space-enlarging lever $H^{62}$, which thereupon arrests the loose dog $H^4$. When the circuit is broken by the means before described, the space-magnet $H^{51}$ loses its magnetism. The contractile spring $H^{37}$ returns the dog-carrying lever H and the armature $H^{52}$ to their normal positions. The loose dog $H^4$ again moves up into the pitch of the rack. The fast dog instantly thereafter clears the rack, which being urged by the carriage-motor-spring mechanism above referred to in the direction of the arrow, Fig. 13, moves down two letter-spaces, when it is arrested by the loose dog $H^4$ coming in contact with the stop $H^{32}$, carried by the lever $H^{30}$; but if either of the space-keys G G be depressed such key, rising back of its fulcrum, will lift one of the arms $H^{60}$ (see Fig. 6) of the rock-shaft $H^{61}$, whose other arm $H^{63}$ will be depressed and through the pull-down $H^{64}$, connected with it, draws that end of said lever $H^{62}$ which carries the stop $H^{34}$ down out of the way of the loose dog $H^4$. The circuit of the magnet $H^{51}$ being closed at the same time by the action of the key or keys depressed on the corresponding one of the circuit-closing frames 18 18, the dogs $H^3$ and $H^4$ will execute the movements already described, except that the loose dog $H^4$ will now move on, (the stop $H^{34}$ being out of its way,) under the influence of its contractile spring $H^{36}$, until it comes in contact with the stop $H^{33}$, which is so adjusted that it allows the loose dog $H^4$ to clear three teeth of the rack $c^{37}$, and when the parts return to their normal positions the carriage will move three tooth-spaces instead of two, thereby providing an additional space at the end of the word. The contractile spring $H^{38}$ serves to return the space-enlarging lever $H^{62}$ to its normal position.

All the parts of the spacing mechanism, it will be observed, are arranged in such a manner that the loose dog $H^4$ when released from the rack $c^{37}$, normally clears two teeth of the said rack, and the carriage on the return of the dogs to their normal positions moves two letter-spaces. If the word printed contains an odd number of letters and the letters of the word are printed by the operator, as they should be, pair by pair, commencing with the first pair of letters and continuing until the last letter of the word is reached, which must then be printed by itself alone, the two spaces which the carriage moves upon the printing of the final letter will afford a sufficient space between such word and the next following word. The operator has nothing whatever to do to make the space at the end of a word containing an odd or uneven number of letters; but if the word printed contains an even number of letters the operator at the same time that he depresses the keys that make the last pair of letters in the word (or the only pair if it be a word of two letters only) depresses one of the space-keys G G, thereby moving the stop $H^{34}$ out of the way of the loose dog $H^4$ and increasing the movement of said loose dog when freed from the rack to such an extent that it clears three teeth of the rack, so that the carriage on the return of the dogs to their normal positions moves three spaces, one of which serves for the interverbal space and the other two for the next pair of letters to be printed.

It is not absolutely indispensable that the printing-points of the two sets of type-bars $a\ a$ and $a'\ a'$ should be separate and distinct. A single printing-point might be used for all the type-bars of both sets by making the set of bars $a'\ a'$ so much slower acting than the set $a\ a$ that a bar of the set $a\ a$ will have time to retreat from the printing-point before the bar of the set $a'\ a'$ reaches it when keys of the two sets are depressed simultaneously, the carriage being advanced in such case a letter-space between the time of striking of the first bar and the time of striking of the second. The necessary difference in the rapidity of action of the bars of the set $a\ a$ and the bars of the set $a'\ a'$ can be obtained by properly adjusting the magnet $B^{30}$ and its armature $B^{31}$. By adding self-induction to the magnet $B^{30}$ the rise of the magnetism will be retarded and the magnet itself as a magnet will be made slower acting, as every electrician well understands. By strengthening the spring $B^{33}$, by increasing the weight of the armature $B^{31}$, and by adjusting the screws $B^{34}$ and $B^{35}$, so that the armature $B^{31}$ cannot start to move until the magnetism in the magnet $B^{30}$ is approaching its maximum and so that said armature will have some distance to move after it starts to move before it can make contact with the screw $B^{35}$ by adjusting some or all of these, all necessary differences in the rapidity of action in the two sets of type-bars can be readily obtained. Also the necessary difference in the rapidity of action of the two motor-magnets $E^{10}\ E^{10}$, if the two sets of type-bars $a\ a$ and $a'\ a'$ be arranged all to strike to one common printing-center, can be obtained in other ways, some of which are set forth in divers prior pending applications of mine, particularly that filed on July 15, 1897, Serial No. 644,673, and that filed on October 23, 1897, Serial No. 656,118.

In regard to the carriage and spacing mechanism: If the two sets of type-bars be adjusted to play to one and the same printing-center, then the normal play of the loose dog $H^4$ should be reduced, so that it will make a single letter-space, and everything should be so adjusted that the circuit of the left-hand-controlled magnet will be broken (by the action of the releasing-magnet $B^{22}$ upon its armature $B^{48}$) before the circuit of the right-hand-controlled magnet is closed, and the space-magnet $H^{51}$ should be wound with two coils, one outside the other, one coil serving for the left-hand-controlled circuits and the other for the right-hand-controlled circuits, said coils being oppositely wound, so that the current in passing through from the right-hand keys will reverse the magnetism produced by the previous current passing through from the left-hand keys; but it is much more advantageous to have separate printing-points for the two sets of type-bars, for thereby either ($a$) less rapid movements of the type-bars are required, the bars of the two sets moving at about the same time, but preferably one a little in advance of the other, or ($b$) the work can be done more rapidly when two blows are delivered and two letters printed at the same instant, or almost at the same instant, than when one type-bar has to return to its normal position before the other can come up to print. On the other hand, it is not at all indispensable that the bars of the one set should be slower acting than the bars of the other set. The magnet $B^{30}$, with its armature $B^{31}$, might be wholly omitted, and the contact-point $18^c$, carried by the circuit-closing frame 18, underlying the left-hand keys, might be connected direct to the switch-lever $B^{48}$. It would not be possible, perhaps, to print letters quite so close together nor to make quite so neat a page; but notwithstanding this the machine will be capable of doing useful work and of writing with great speed.

Instead of making the circuits controlled by the left-hand keys slower acting by means of such a device as the magnet $B^{30}$, with its armature $B^{31}$, Fig. 17, we might at least, when separate printing-points are used for the two sets of type-bars $a\ a$ and $a'\ a'$ and a phase difference only is desired in the movements of the two simultaneously-acting bars, make the bars of the set $a'\ a'$ slower acting than those of the set $a\ a$ by inserting a sufficient inductance in the wire leading from the contact-point $18^c$ (carried by the circuit-closing frame 18, underlying the left-hand keys) to the switch-lever $B^{48}$, whereby the rise of current in the left-hand-controlled motor-magnet $E^{10}$ will be retarded. A soft-iron ring, preferably laminated and suitably wound with insulated copper wire, would be a convenient form of inductance to use, as every electrician knows; but the retarding-magnet $B^{30}$, with its armature $B^{31}$, Fig. 17, is more readily adjusted than a self-induction, and, moreover, the sparking is less with such a device than it would be with a self-induction used as a substitute for it, so that I prefer the form of retarding device illustrated in Fig. 17 without, however, at all limiting myself to it.

In the drawings I show eight group-controlling elements $e$, $e'$, $e^2$, $e^3$, $e^4$, $e^5$, $e^6$, and $e^7$ in a set, each of which, except the normal element $e$, controls a group of four type-bar-connected levers $f f$, the carrier K being shifted into the different positions necessary to bring each group-controlling element into operative relation (through the corresponding pins $k'\ k^2\ k^3$, &c., acting as movement-transmitters) to the different levers $f f f$ of the group controlled by it, each as required; but obviously a greater or less number of group-controlling elements may be used, and a greater or less number of levers $f f$ or their equivalents may be controlled by the different controlling elements, the carrier K or its equivalent being shifted into the different positions required. All this will be obvious to any person skilled in the art.

It is convenient to dispose the levers $f f$ radially; but obviously it is not necessary that they be perfect radii or that they be exactly radial, and obviously they might be disposed tangentially instead of radially. The main thing is that they be arranged substantially arc fashion.

Some other mechanical elements might doubtless be substituted for the levers $f f$ as a connection between the pins $k'$ $k^2$ $k^3$, &c., or their equivalent movement-transmitters and the type-bars, but the levers $f f$ are the most convenient construction that I know of.

Some other mechanical element might doubtless be substituted for the group-controlling levers $e$ $e'$ $e^2$, &c., as equivalents of them. The arrangement shown, however, is the most convenient that I am aware of for the purpose.

Some other form of movement-transmitters could doubtless be substituted for the pins $k'$ $k^2$ $k^3$, &c. I have, in fact, contrived several devices for the purpose, but that illustrated in the drawings is the best.

I have shown two motor devices, two sets of group-controlling levers $e$ $e'$ $e^2$ $e^3$, &c., two oscillating pin-carriers K K, carrying the sets of movement-transmitters $k'$ $k^2$ $k^3$, two sets of levers $f f$, and two sets of type-bars, whereby a machine is made capable of printing letters in pairs; but obviously for printing letters one at a time a single motor device may be used with a single set of group-controlling levers, a single pin-carrier with a single set of pins, a single set of levers $f f$, and a single set of type-bars. In such case the arcs occupied by the levers $f f$, by the pins $k'$ $k^2$ $k^3$, &c., and by the segmental ends of the group-controlling levers $e'$ $e^2$ $e^3$, &c., might be increased to a complete circle, if desired. Such a form of device is described and claimed in my other pending application, Serial No. 684,880, filed June 30, 1898.

Some other motor device may be used, if desired, instead of the motor-magnet $E^{10}$. For example, a pneumatic-power device of the sort commonly used in an organ might, with suitable valve mechanism of the sort commonly used in an organ to control the pneumatic-power devices thereof, be substituted for said motor-magnet $E^{10}$. While, therefore, I consider an electromagnet to be the best form of motor device in most situations, I wish it to be very clearly understood that I do not at all limit myself to using an electromagnet as the motor device.

Instead of using a single motor device to impel all the group-controlling elements $e$ $e'$ $e^2$ $e^3$, &c., of a set separate motor devices might be used for the different group-controlling elements, said motor devices being arranged and controlled, for example, substantially after the fashion illustrated in my pending application, Serial No. 650,511, filed August 31, 1897, or in any other suitable way, or after the fashion illustrated in Letters Patent of the United States, No. 600,120, dated March 1, 1898, to me, in which separate magnets E, $E'$, $E^2$, $E^3$, $E^4$, $E^5$, $E^6$, and $E^7$ are used to control the group-controlling levers $e$, $e'$, $e^2$, $e^3$, $e^4$, $e^5$, $e^6$, and $e^7$, illustrated and described in said specification.

Sometimes I speak in this specification, and particularly in the statement of claims at the end hereof, of a "shifting device" or of "shifting mechanism." The kinds of shifting devices used in type-writing machine and other keyboard printing instrumentalities are very various. In type-writing machines a common kind of shifting device is that in which the platen is shifted. Another common kind is that in which the type-bars themselves are shifted. In the drawings the only shifting device shown is the pin-carrier K, with its pins $k$ $k'$ $k^2$ $k^3$, &c., and the means for shifting said carrier and pins; but certain features of my invention, particularly in connection with the stopping means for the shifting device, said stopping means being controlled by one or more keys, are applicable generally to shifting devices in a type-writing machine or other similar instrument where it is required to throw the body to be shifted into several different positions and to arrest it promptly in the position required. So, also, the features of my present invention by which any premature acting of the motor device is prevented while the shifting is taking place are applicable generally to all sorts of shifting devices in a type-writing machine or other keyboard-printing instrumentality where it is important to prevent the motor device from acting while the shifting is taking place. When, therefore, in the statement of claims at the end hereof I speak of a "shifting mechanism" or a "shifting device" without expressing other limitations as to such shifting mechanism or shifting device, I use the term broadly and do not by any means restrict it to the kind of shifting mechanism figured in the drawings.

Sometimes in the statement of claims at the end hereof I speak of a "shift-key." That term is commonly used in the type-writing art with reference to a key for shifting the platen or the type-bars or some other part of a type-writing machine to change from lower-case alphabet to upper-case alphabet, or vice versa, or to change from letters to figures and marks; but the keys $B'$ $B^2$ $B^3$ in the drawings are also in a certain sense shift-keys. They differ widely from the common shift-key, which acts to change from lower case to upper case, or vice versa, (in each of which cases, as before said, there is a complete change of alphabet,) in that the shift-keys $B'$ $B^2$ $B^3$ are used to print letters and are used also in combination with the other keys to make a great part of the letters of a single alphabet; also, said keys $B'$ $B^2$ $B^3$ are depressed simultaneously with the printing-keys, while the common shift-key, which performs the function of changing from one alphabet to another, must be depressed in advance of the printing-key. The keys $B'$ $B^2$ $B^3$ in the drawings differ also in other particulars from the shift-keys in common use. In a certain sense, as before said, the keys B' B² B³ are shift-keys, for they shift the pin-carrier—that is, throw it from one position to another; but when I use the word "shift-key" or a similar expression in the paragraphs of claim at the end hereof without other limitations expressed I use the word in its broad sense, as referring to any kind of shift-key whatever, whether of the kind illustrated in the drawings or of the kind in common use. The terms "shift-key," "shifting mechanism," or other similar terms are thus broadly used in the claims only when no limitation is expressed in the same paragraph of claim; but if a limitation be expressed the meaning is narrowed to the extent of such limitation.

Certain important features of my invention, it will be observed, are applicable to any sort of shifting mechanism controlled by a shift-key, as well as to a pin-carrier controlled by the keys B' B² B³ in the drawings. Thus, for example, the feature of a device controlled by the shift-keys and operating to prevent the acting of a motor while the shifting is taking place and the use of stops controlled by one or more of the shift-keys and acting to arrest the body shifted are applicable to any sort of shifting mechanism in a type-writing machine, linotype-machine, type-composing machine, or other similar keyboard printing instrumentality, whatever the thing shifted or positioned may be, and I desire full protection for all the various features and all the various uses of my invention.

It is a fact which has long been recognized in the art that certain selecting devices are applicable alike to type-writing machines and to other keyboard printing instrumentalities, such as type-setting machines, linotype-machines, printing-telegraphs, &c. Certain important features of my invention are applicable to selecting devices generally, whether used in one or another of the instruments above mentioned, while other important features of my invention are applicable only to use in a type-writing machine. When, therefore, in any of the paragraphs of claim at the end hereof I claim the combination "in a type-writing machine" merely, I mean to restrict my claim to the combination enumerated when used in and forming part of a type-writing machine; but when, on the other hand, any paragraph of claim at the end hereof commences with the words "In a character-selecting device for a keyboard printing instrumentality" or with the shorter form of words "In a character-selecting device" the combination set forth in said paragraph is one which is applicable to other keyboard printing instrumentalities than type-writers, and the claim is not intended to be limited and is not limited to type-writers, but is made, broadly, for the combination set forth in said claim in any keyboard printing instrumentality or type-selecting device whatsoever.

Sometimes in the paragraphs of claim at the end hereof I speak of "shiftable" connections or of "shifting" connections. The pins $k, k', k^2, k^3$, &c., are one kind of shiftable connection, and they are the best that I know of for use in a type-writing machine of the kind figured in the drawings; but other kinds of shiftable connections or of shifting connections than said pins may be used, if desired, instead of said pins.

In various places in the statement of claim at the end hereof I speak of preventing the premature actuating of a type-bar, or the premature closing of a circuit, or of the premature acting of a motor device while the shifting is taking place, or use other language of similar import. I do not mean by this language that the type-bar may not begin to be actuated or the circuit begin to be closed during the latter part of the shifting, for it may. I only mean to prevent the premature—that is, the too early—actuating of the type-bar or closing of the circuit or calling into action of the motor of whatsoever kind the motor may be while the shifting is taking place.

Numerous modifications may be made without departing from the essential principles of my invention, which are set forth in the statement of claim at the end hereof. Thus, apart from the fact that essential features of my invention may be used in other machines than type-writing machines, I have contrived other forms of group-controlling members than the levers $e\ e'\ e^2\ e^3$, &c., illustrated in the drawings. I have contrived other forms of controlled members than the levers $ff$ illustrated in the drawings. I have contrived other forms of movement-transmitting members or of shiftable connections than the pins $k\ k'\ k^2\ k^3$, &c., illustrated in the drawings. I have contrived other forms of motor-frame than the frame $E^{12}$ illustrated in the drawings, other forms of motor device than an electromagnet, other forms of device operated by the shift-keys, (or otherwise connected with the shifting mechanism,) whereby a motor is prevented from acting prematurely while the shifting is taking place, than the circuit-controlling device illustrated in the drawings. I have contrived other forms of releasing device for stopping the motor and permitting the type-bar to return to its normal position in advance of the release of the key than the circuit-controlling lever $B^{48}$, operated by the type-bar-impelling electromagnet. I have contrived other forms of detent device than the electromagnet $B^{22}$, acting on the armature $B^{21}$, connected with the lever $B^{48}$.

It will be understood, then, since so many modifications of detail may be made, that I do not at all limit myself to the details of construction figured in the drawings, but only to the essential combinations set forth in the paragraphs of claim at the end hereof, reasonably interpreted in the light of the state of the art.

I do not claim herein anything that is claimed in any of my other pending applications, and particularly I do not claim anything that is claimed in my other pending applications, Serial No. 601,520, filed August 3, 1896, and Serial No. 684,880, filed June 30, 1898; but What I do claim as of my own invention, and desire to secure by Letters Patent upon this present application, is—

1. In a type-writing machine, in which the letters of the alphabet are controlled by means of keys fewer in number than the letters of the alphabet, the combination with an alphabet of type-bars striking to a common printing center, of a selecting device for selecting the different type-bars of said alphabet; said selecting device including an oscillating segmental pin-carrier, with movement-transmitting pins mounted in and supported by said carrier to move longitudinally independently of each other, and to move as a set with said pin-carrier.

2. In a type-writing machine, in which the letters of the alphabet are controlled by means of keys fewer in number than the letters of the alphabet, the combination with an alphabet of type-bars striking to a common printing-center, of a selecting device for selecting the different type-bars of said alphabet; said selecting device including an oscillating segmental pin-carrier, with movement-transmitting pins mounted in and supported by said carrier to move longitudinally independently of each other, and to move as a set with said pin-carrier; and one or more keys, for positioning said pin-carriers.

3. In a type-writing machine, in which the letters of the alphabet are controlled by means of keys fewer in number than the letters of the alphabet, the combination with an alphabet of type-bars striking to a common printing-center of a selecting device for selecting the different type-bars of said alphabet; said selecting device including an oscillating segmental pin-carrier, with movement-transmitting pins mounted in and supported by said carrier to move longitudinally independently of each other, and to move as a set with said pin-carrier; a key, acting to position said pin-carrier; and a stop, whereby the movement of said pin-carrier under the action of said key, is arrested.

4. In a type-writing machine, the combination with type-bars striking to a common printing-center, of a type-bar-selecting device, including an oscillating segmental pin-carrier, with movement-transmitting pins mounted in and supported by said carrier, to move longitudinally independently of each other, and to move as a set with the pin-carrier aforesaid.

5. In a type-writing machine, the combination with type-bars striking to a common printing-center, of a type-bar-selecting device, including an oscillating segmental pin-carrier, with movement-transmitting pins mounted in and supported by said carrier, to move longitudinally independently of each other, and to move as a set with the pin-carrier aforesaid; and returning-springs in said carrier, whereby said pins are held in their normal positions.

6. In a type-bar-selecting device for a type-writing machine, (a) an oscillating segmental pin-carrier, with movement-transmitting pins mounted in said carrier to move longitudinally independently of each other, and to move as a set with said carrier; (b) a plurality of keys, whereby said carrier is oscillated into different positions; and (c) stop mechanism for said carrier; said stop mechanism being controlled by one or more of the keys aforesaid.

7. In a type-bar-selecting device for use in a type-writing machine, an oscillating segmental pin-carrier, with movement-transmitting pins mounted in said carrier to move longitudinally independently of each other, and to move bodily as a set with the pin-carrier aforesaid; returning-springs in said carrier, whereby said pins are held in their normal positions; a plurality of keys whereby said carrier is oscillated into different positions; and stop mechanism for said carrier; said stop mechanism being controlled by one or more of the keys aforesaid.

8. In a type-bar-selecting device for a type-writing machine and in combination, (a) an oscillating segmental pin-carrier, with movement-transmitting pins mounted therein and supported thereby, to move longitudinally independently of each other, and to move as a set with said pin-carrier; (b) a key for oscillating said pin-carrier; (c) a bell-crank, actuated by said key, and serving to transmit movement to said pin-carrier; and (d) a stop for arresting said pin-carrier when thus moved by the key.

9. In a type-bar-selecting device for a type-writing machine and in combination, (a) an oscillating segmental pin-carrier, with movement-transmitting pins mounted therein, to move longitudinally independently of each other, and to move as a set with said pin-carrier; (b) a plurality of keys for oscillating said pin-carrier into different positions as required; (c) a bell-crank actuated by said keys and connected with said pin-carrier; and (d) means for arresting said pin-carrier, including a movable stop controlled by one of the keys aforesaid.

10. In a type-bar-selecting device for a type-writing machine and in combination, (a) an oscillating segmental pin-carrier, with movement-transmitting pins mounted therein, to move longitudinally independently of each other, and to move as a set with said pin-carrier; (b) a plurality of keys for oscillating said pin-carrier into different positions as required; (c) means for arresting said pin-carrier, including a movable stop and a connection between one of the keys aforesaid and said stop, whereby said stop is controlled; and (e) a fixed stop against which the pin-carrier abuts when moved its maximum distance by one of the keys aforesaid.

11. In a type-writing machine, in which the letters of the alphabet are controlled by means of keys fewer in number than the letters of the alphabet, the combination with an alphabet of type-bars striking to a common printing-center, of a selecting device for selecting the different type-bars of said alphabet; said selecting device including, (a) a set of controlling members; (b) a set of controlled members more numerous than the controlling members aforesaid; (c) an oscillating segmental pin-carrier, with movement-transmitting pins mounted therein and supported thereby, to move longitudinally independently of each other, and to move as a set with said carrier; said pins moving bodily intermediate the controlling members before mentioned and the controlled members before mentioned, in order to bring the different controlled members operated by a controlling member into operative relation therewith, each as required; each of the movement-transmitting pins aforesaid serving to transmit movement from one of said controlling members to the controlled members aforesaid corresponding thereto, each as required.

12. In a type-writing machine, in which the letters of the alphabet are controlled by means of keys fewer in number than the letters of the alphabet, the combination with an alphabet of type-bars striking to a common printing-center, of selecting devices for selecting the different type-bars of said alphabet; said selecting devices including, (a) a set of controlling members; (b) a set of controlled members more numerous than the controlling members aforesaid; (c) an oscillating segmental pin-carrier, with movement-transmitting pins mounted therein and supported thereby, to move longitudinally independently of each other, and to move as a set with said carrier; said pins moving bodily intermediate the controlling members before mentioned, and the controlled members before mentioned, corresponding thereto; and (d) key mechanism whereby said segmental pin-carrier is oscillated or shifted to different positions as required, to connect the different controlling members aforesaid with the different controlled members operated by them, each as required.

13. In a type-writing machine, in which the letters of the alphabet are controlled by means of keys fewer in number than the letters of the alphabet, the combination with an alphabet of type-bars striking to a common printing-center, of a selecting device for selecting the different type-bars of said alphabet; said selecting device including, (a) levers corresponding to the type-bars aforesaid, a lever for each type-bar; (b) means whereby said levers are connected, each with the type-bar to which it corresponds; (c) an oscillating segmental pin-carrier; (d) movement-transmitting pins fewer in number than the letters of the alphabet, mounted in and supported by said carrier, to move longitudinally therein independently of one another, to act upon the type-bar-corresponding levers aforesaid to give movement to said levers and the type-bars connected therewith, each as required; (e) means whereby the carrier aforesaid is oscillated to bring its different pins aforesaid into operative relation with the different type-bar-corresponding levers upon which they act; (f) members each controlling one of the pins aforesaid in its different positions, and serving by giving movement to said pin to give movement to the different type-bar-corresponding levers upon which said pin acts, each as required.

14. In a type-writing machine, in which the letters of the alphabet are controlled by means of keys fewer in number than the letters of the alphabet, the combination with an alphabet of type-bars striking to a common printing-center, of a selecting device for selecting the different type-bars of said alphabet; said selecting device including, (a) levers corresponding to the type-bars aforesaid, a lever for each type-bar; (b) means whereby said levers are connected each with the type-bar to which it corresponds; (c) an oscillating segmental pin-carrier; (d) movement-transmitting pins fewer in number than the letters of the alphabet, mounted in said carrier, to move longitudinally therein independently of one another; to act upon the type-bar-corresponding levers aforesaid to give movement to said levers and the type-bars connected therewith, each as required; (e) means whereby the carrier aforesaid is oscillated to bring its different pins aforesaid into operative relation with the different type-bar-corresponding levers upon which they act; (f) members each controlling one of the pins aforesaid in its various positions, and serving by giving movement to said pin to give movement to the different type-bar-corresponding levers upon which said pin acts, each as required; (g) keys corresponding to the controlling members aforesaid; (h) motor mechanism, controlled by said keys, for actuating said controlling members; and (i) one or more other keys for positioning said pin-carrier.

15. In a type-writing machine, in which the letters of the alphabet are controlled by means of keys fewer in number than the letters of the alphabet, the combination with an alphabet of type-bars striking to a common printing-center, of a selecting device for selecting the different type-bars of said alphabet; said selecting device including, (a) levers corresponding to the type-bars aforesaid, a lever for each type-bar; (b) means whereby said levers are connected, each with the type-bar to which it corresponds; (c) an oscillating segmental pin-carrier; (d) movement-transmitting pins fewer in number than the letters of the alphabet, mounted in said carrier, to move longitudinally therein independently of one another, to act upon the type-bar-corresponding levers aforesaid to give movement to said levers and the type-bars connected therewith, each as required; (e) segment-furnished levers, each controlling one of the pins aforesaid in its various positions, and serving to give movement to said pins, thereby to give movement to the different type-bar-corresponding levers upon which said pin acts, each as required.

16. In a type-writing machine, in which the letters of the alphabet are controlled by means of keys fewer in number than the letters of the alphabet, the combination with an alphabet of type-bars striking to a common printing-center, of a selecting device for selecting the different type-bars of said alphabet; said selecting device including, (a) a set of levers corresponding respectively to and connected respectively with the type-bars aforesaid; said type-bar-corresponding levers being disposed arc fashion; (b) group-controlling members fewer in number than the letters of the alphabet, each serving to control a plurality of the type-bar-corresponding levers aforesaid; (c) movement-transmitting members, equal in number to the group-controlling members aforesaid; each of said movement-transmitting members serving to connect the corresponding group-controlling member with the different type-bar-corresponding levers to which it gives movement, each as required; and (d) means acting upon the movement-transmitting members aforesaid as a set, to bring each of the group-controlling members aforesaid into operative relation with the different type-bar-corresponding levers controlled thereby each as required.

17. In a type-writing machine, in which the letters of the alphabet are controlled by means of keys fewer in number than the letters of the alphabet, the combination with an alphabet of type-bars striking to a common printing-center, of selecting devices for selecting the different type-bars of said alphabet; said selecting devices including, (a) a set of levers corresponding respectively to and connected respectively with the type-bars aforesaid; said type-bar-corresponding levers being disposed arc fashion; (b) group-controlling members fewer in number than the letters of the alphabet, each serving to control a plurality of the type-bar-corresponding levers aforesaid; (c) movement-transmitting members, equal in number to the group-controlling members aforesaid; each of said movement-transmitting members serving to connect the corresponding group-controlling member with the different type-bar-corresponding levers to which it gives movement, each as required; (d) a shifter for said movement-transmitting members, acting upon said movement-transmitting members as a set; (e) a plurality of keys, for positioning said shifter; (f) stop mechanism controlled by one or more of said keys for arresting said shifter and the movement-transmitting members connected therewith.

18. In a type-writing machine, in which the letters of the alphabet are controlled by means of keys fewer in number than the letters of the alphabet, the combination with an alphabet of type-bars striking to a common printing-center, of a selecting device for selecting the different type-bars of said alphabet; said selecting device including, (a) a set of levers corresponding respectively to and connected respectively with the type-bars aforesaid; said type-bar-corresponding levers being disposed arc fashion; (b) group-controlling members fewer in number than the letters of the alphabet, each serving to control a plurality of the type-bar-corresponding levers aforesaid; (c) movement-transmitting members, equal in number to the group-controlling members aforesaid, each of said movement-transmitting members serving to connect the corresponding group-controlling member with the different type-bar-corresponding levers to which it gives movement, each as required; (d) keys, and motor mechanism controlled thereby, whereby the different group-controlling members aforesaid are caused to act, each as required; (e) a shifter for said movement-transmitting members, acting upon said movement-transmitting members as a set; and (f) one or more keys controlling said shifter.

19. In a type-writing machine, in which the letters of the alphabet are controlled by means of keys fewer in number than the letters of the alphabet, the combination with an alphabet of type-bars striking to a common printing-center, of a selecting device for selecting the different type-bars of said alphabet; said selecting device including, (a) a set of levers corresponding respectively to and connected respectively with the type-bars aforesaid; said type-bar-corresponding levers being disposed arc fashion; (b) group-controlling members fewer in number than the letters of the alphabet, each serving to control a plurality of the type-bar-corresponding levers aforesaid; (c) movement-transmitting members, equal in number to the group-controlling members aforesaid; each of said movement-transmitting members serving to connect the corresponding group-controlling member with the different type-bar-corresponding levers to which it gives movement, each as required; (d) a frame for communicating movement to the different group-controlling members aforesaid each as required; (e) a motor device for actuating said frame; (f) keys, acting to connect the different group-controlling members aforesaid, each as required, with the frame aforesaid, and to bring the motor device aforesaid into action, to impel said frame; (g) a shifter for said movement-transmitting members, acting upon said movement-transmitting members as a set; and (h) one or more keys for positioning said shifter.

20. In a type-bar-selecting device for a type-writing machine, and in combination therein with a plurality of groups of type-bars, striking to a common printing-center, (a) a set of levers corresponding respectively to and connected respectively with the type-bars aforesaid; (b) group-controlling members, each serving to control a plurality of the type-bars and type-bar-corresponding levers aforesaid; (c) movement-transmitting pins equal in number to the number of group-controlling members aforesaid; said pins each acting to transmit movement from one of the group-controlling members aforesaid to the different type-bar-corresponding levers controlled by said group-controlling member, each as required; (d) an oscillating segmental pin-carrier, wherein said pins are mounted and whereby said pins are supported, to move longitudinally independently of each other, and to move bodily as a set intermediate the group-controlling members aforesaid and the type-bar-corresponding levers aforesaid.

21. In a type-bar-selecting device for a type-writing machine, and in combination therein with a plurality of groups of type-bars, striking to a common printing-center, (a) a set of levers corresponding respectively to and connected respectively with the type-bars aforesaid; (b) group-controlling members, each serving to control a plurality of the type-bars and type-bar-corresponding levers aforesaid; (c) movement-transmitting pins equal in number to the number of group-controlling members aforesaid; said pins each acting to transmit movement from one of the group-controlling members, aforesaid, to the different type-bar-corresponding levers controlled by said group-controlling member, each as required; (d) an oscillating segmental pin-carrier, wherein said pins are mounted to move longitudinally independently of each other, and to move bodily as a set intermediate the group-controlling members aforesaid and the type-bar-corresponding levers aforesaid; (e) a plurality of keys for positioning said pin-carrier; and (f) stop mechanism, controlled by one or more of said keys, for arresting said pin-carrier in the position required.

22. In a type-bar-selecting device for a type-writing machine, and in combination therein with a plurality of groups of type-bars, striking to a common printing-center, (a) a set of levers corresponding respectively to and connected respectively with the type-bars aforesaid; (b) group-controlling members, each serving to control a plurality of the type-bars and type-bar-corresponding levers aforesaid; (c) movement-transmitting pins, equal in number to the number of group-controlling members aforesaid; said pins each acting to transmit movement from one of the group-controlling members aforesaid to the different type-bar-corresponding levers controlled by said group-controlling member, each as required; (d) an oscillating segmental pin-carrier, wherein said pins are mounted to move longitudinally independently of each other, and to move bodily as a set intermediate the group-controlling members aforesaid and the type-bar-corresponding levers aforesaid; (e) keys, and motor mechanism controlled thereby whereby the different group-controlling members aforesaid are caused to act each as required; and (f) one or more other keys for positioning the pin-carrier aforesaid.

23. In a type-writing machine, in which the letters of the alphabet are controlled by means of keys fewer in number than the letters of the alphabet, the combination with an alphabet of type-bars striking to a common printing-center of a selecting device for selecting the different type-bars of the same alphabet, each as required; said selecting device including, (a) a set of levers radially or tangentially disposed, corresponding respectively to and connected respectively with the type-bars aforesaid; (b) group-controlling levers, fewer in number than the type-bars aforesaid, each serving to control a plurality of the type-bars aforesaid, corresponding respectively to different letters of the alphabet; (c) movement-transmitters, intermediate said group-controlling levers and the radially-disposed type-bar-corresponding levers aforesaid; and (d) a shifter for the movement-transmitting members aforesaid, whereby the different group-controlling levers aforesaid are connected each as required, with the different type-bar-corresponding levers of the group controlled by said group-controlling lever.

24. In a type-writing machine, in which the letters of the alphabet are controlled by means of keys fewer in number than the letters of the alphabet, the combination with an alphabet of type-bars striking to a common printing-center, of a selecting device for selecting the different type-bars of said alphabet, each as required; said selecting device including, (a) a set of levers radially or tangentially disposed, corresponding respectively to and connected respectively with the type-bars aforesaid; (b) group-controlling levers each serving to control a plurality of the type-bars aforesaid; (c) movement-transmitters, intermediate said group-controlling levers and the radially-disposed type-bar-corresponding levers aforesaid; (d) a shifter for the movement-transmitting members aforesaid, whereby the different group-controlling levers aforesaid are connected each as required, with the different type-bar-corresponding levers of the group controlled by said group-controlling lever; (e) keys, and motor mechanism controlled thereby whereby the different group-controlling levers aforesaid are caused to act each as required; and (f) one or more other keys for positioning the shifter aforesaid.

25. In a type-writing machine, and in combination, (a) a plurality of type-bars striking to a common printing-center; (b) a set of levers radially or tangentially disposed, corresponding respectively to and connected respectively with the type-bars aforesaid; (c) group-controlling levers, each arranged to control a plurality of the type-bars aforesaid;

(d) movement-transmitting pins intermediate said group-controlling levers and the type-bar-corresponding levers aforesaid, a movement-transmitting pin for each group-controlling lever; and (e) an oscillating segmental pin-carrier wherein said pins are mounted to move longitudinally independently of each other, and to move bodily as a set intermediate the group-controlling levers aforesaid and the type-bar-corresponding levers aforesaid.

26. In a type-writing machine, and in combination, (a) a plurality of type-bars striking to a common printing-center; (b) a set of levers radially or tangentially disposed, corresponding respectively to and connected respectively with the type-bars aforesaid; (c) group-controlling levers, each arranged to control a plurality of the type-bars aforesaid; (d) movement-transmitting pins intermediate said group-controlling levers and the type-bar-corresponding levers aforesaid, a movement-transmitting pin for each group-controlling lever; (e) an oscillating segmental pin-carrier wherein said pins are mounted to move longitudinally independently of each other, and to move bodily as a set intermediate the group-controlling levers aforesaid and the type-bar-corresponding levers aforesaid; (f) keys, and means controlled thereby whereby the different group-controlling levers aforesaid are caused to act, each as required, for the impelling of a type-bar; and (g) one or more other keys for positioning the pin-carrier aforesaid.

27. In a type-writing machine, in which the letters of the alphabet are controlled by means of keys fewer in number than the letters of the alphabet, the combination with an alphabet of type-bars striking to a common printing-center, of a selecting device for selecting the different type-bars of said alphabet each as required, said selecting device including (a) the levers $f, f$; (b) connections intermediate said levers and said type-bars; (c) group-controlling levers; (d) suitable movement-transmitters equal in number to the group-controlling levers aforesaid, disposed intermediate said group-controlling levers and the levers $f, f$, to communicate movement from the group-controlling levers aforesaid to the levers $f, f$, aforesaid; and (e) means whereby said movement-transmitters are shifted as a set, to bring the different group-controlling levers aforesaid each into operative relation with the different levers $f, f$, controlled by it, as required.

28. In a type-writing machine, and in combination, (a) a plurality of type-bars; (b) levers $f, f$; (c) connections intermediate said levers $f, f$, and said type-bars; (d) group-controlling levers; (e) movement-transmitting pins, equal in number to the number of group-controlling levers aforesaid, a pin for each group-controlling lever; and (f) an oscillating segmental pin-carrier, wherein said pins are mounted to move longitudinally independently of one another, and to move bodily as a set intermediate the group-controlling levers aforesaid and the levers $f, f$, aforesaid.

29. In a type-writing machine, and in combination therein, with a plurality of groups of type-bars striking to a common printing-center, a type-bar-selecting device, including a set of group-controlling levers, said levers being disposed parallel or nearly parallel with each other, and having their ends segment-shaped to form an arc.

30. In a type-bar-selecting device, the combination with segment-furnished group-controlling levers, of an oscillating segmental pin-carrier with movement-transmitting pins mounted therein, to move longitudinally independently of each other, a pin for each of the group-controlling levers aforesaid, and returning-springs for said pins.

31. In a type-writing machine, and in combination, (a) a plurality of groups of type-bars; (b) a motor-frame; (c) group-controlling levers furnished with segments; (d) a series of shiftable movement-transmitters, whereon said segments act; and (e) keys, and means controlled thereby, whereby the different group-controlling levers aforesaid are connected, each as required, with the motor-frame aforesaid, to receive movement therefrom.

32. In a type-writing machine, and in combination therein with a plurality of groups of type-bars striking to a common printing-center, a type-bar-selecting mechanism, including, (a) a type-bar-impelling frame; (b) group-controlling levers, each corresponding to a different one of the groups of type-bars aforesaid; (c) arms, pivoted on said group-controlling levers to receive movement from the type-bar-impelling frame aforesaid; (d) bell-cranks having their vertical arms connected with the pivoted arms before mentioned, and having their horizontal arms of varying lengths; and (e) key-levers for actuating said bell-cranks, thereby to connect the group-controlling levers aforesaid with the type-bar-impelling frame aforesaid, each as required.

33. In a type-writing machine, and in combination therein with a plurality of groups of type-bars striking to a common printing-center, a type-bar-selecting mechanism, including, (a) a type-bar-impelling frame; (b) group-controlling levers, each corresponding to a different one of the groups of type-bars aforesaid; (c) arms, pivoted on said group-controlling levers to receive movement from the type-bar-impelling frame aforesaid; (d) bell-cranks, having their vertical arms connected with the pivoted arms before mentioned, and having their horizontal arms of varying lengths; (e) key-levers for actuating said bell-cranks, thereby to connect the group-controlling levers aforesaid with the type-bar-impelling frame aforesaid, each as required; (f) a motor device, for actuating the type-bar-impelling frame aforesaid; and (g) means controlled by the key-levers aforesaid, and serving when said key-levers are depressed, to bring said motor device into action, so that it impels the frame aforesaid.

34. In a type-writing machine, in which the letters of the alphabet are controlled by operating upon keys fewer in number than the letters of the alphabet, the combination with an alphabet of type-bars of a selecting device therefor, including, (a) radially-disposed levers corresponding to and connected respectively with the type-bars aforesaid; (b) group-controlling levers for controlling different groups of the type-bars aforesaid; (c) movement-transmitting pins, one for each group-controlling lever, for connecting said group-controlling levers with the different type-bar-corresponding levers operated thereby, each as required; (d) a carrier for said pins, wherein said pins are mounted to move longitudinally independently of each other, and to move as a set with said carrier; (e) a motor-frame; (f) arms pivoted to the group-controlling levers aforesaid, to receive movement from said motor-frame; said arms being normally free from said motor-frame; (g) bell-cranks, having their vertical arms connected with the arms before mentioned as pivoted to the group-controlling levers aforesaid; and (h) keys for actuating said bell-cranks.

35. In a type-writing machine, the combination with a plurality of groups of type-bars arranged so that they strike to a common printing-center, of type-bar-controlling mechanism, including, (a) radially-disposed levers corresponding to and connected respectively with the type-bars aforesaid; (b) group-controlling levers for controlling different groups of the type-bars aforesaid; (c) movement-transmitting pins, one for each group-controlling lever, for connecting said group-controlling lever with the different type-bar-corresponding levers operated thereby, each as required; (d) a carrier for said pins, wherein said pins are mounted to move longitudinally independently of each other, and to move as a set with said carrier; (e) a motor-frame; (f) arms pivoted to the group-controlling levers aforesaid, to receive movement from said motor-frame; said arms being normally free from said motor-frame; (g) bell-cranks, having their vertical arms connected with the arms before mentioned as pivoted to the group-controlling levers aforesaid; (h) keys for actuating said bell-cranks; (i) a motor, controlled by the keys aforesaid, for actuating the frame aforesaid; and (k) one or more other keys for positioning the carrier aforesaid.

36. In a type-writing machine, in which the letters of the alphabet are controlled by operating upon keys fewer in number than the letters of the alphabet, the combination with an alphabet of type-bars of a selecting device therefor, including, (a) radially-disposed levers corresponding to and connected respectively with the type-bars aforesaid; (b) group-controlling levers for controlling different groups of said type-bars; (c) movement-transmitting pins, one for each group-controlling lever, for connecting said group-controlling levers with the different type-bar-corresponding levers operated thereby, each as required; (d) a carrier for said pins, wherein said pins are mounted to move longitudinally independently of each other, and to move as a set with said carrier; (e) a motor-frame; (f) arms pivoted to the group-controlling levers aforesaid, to receive movement from said motor-frame; said arms being normally free from said motor-frame; (g) bell-cranks, having their vertical arms connected with the arms before mentioned as pivoted to the group-controlling levers aforesaid; (h) keys for actuating said bell-cranks; (i) an electromagnet for actuating the motor-frame aforesaid; (k) a circuit-closing frame for said electromagnet, operated by the keys aforesaid; and (l) one or more other keys for positioning the carrier aforesaid.

37. In a type-writing machine constructed to afford facility to the operator to make the letters in pairs simultaneously, and in combination, (a) two alphabets of type-bars arranged on opposite sides of the printing center or centers; (b) radially-disposed levers, $f$, $f$, corresponding to said type-bars; and (c) links whereby each of said levers is connected with the corresponding type-bar.

38. In a type-writing machine constructed to afford facility to the operator to make the letters in pairs simultaneously, and in combination, (a) two sets of type-bars arranged on opposite sides of the printing center or centers; (b) two sets of radially-disposed levers, corresponding to said type-bars; (c) a set of keys, and motor mechanism controlled thereby, for operating one of the sets of type-bars aforesaid; and (d) other keys, and motor mechanism controlled thereby, for operating the other one of the sets of type-bars aforesaid.

39. In a type-writing machine and in combination, (a) two sets of type-bars; (b) two sets of levers, corresponding respectively to and connected respectively with the type-bars aforesaid; the two sets of type-bar-corresponding levers aforesaid being each disposed arc fashion; (c) two sets of group-controlling members disposed on opposite sides of the printing-center; each of said group-controlling members acting to control a different group of the type-bars aforesaid; (d) a set of movement-transmitters intermediate one of the sets of group-controlling members aforesaid and the corresponding set of type-bar-corresponding levers; (e) another set of movement-transmitters intermediate the other set of group-controlling members aforesaid and the set of type-bar-corresponding levers controlled by them; and (f) two shifting devices, one acting to control one of the sets of movement-transmitters above mentioned, and the other acting to control the other set of movement-transmitters aforesaid.

40. In a type-writing machine and in combination, (a) two sets of type-bars; (b) two sets of levers, corresponding respectively to and connected respectively with the type-bars aforesaid; the two sets of type-bar-corresponding levers aforesaid being each disposed arc fashion; (c) two sets of group-controlling members disposed on opposite sides of the printing-center; each of said group-controlling members acting to control a different group of the type-bars aforesaid; (d) a set of movement-transmitters intermediate one of the sets of group-controlling members aforesaid, and the corresponding set of type-bar-corresponding levers; (e) another set of movement-transmitters intermediate the other set of group-controlling members aforesaid and the set of type-bar-corresponding levers controlled by them; (f) two shifting devices, one acting to control one of the sets of movement-transmitters above mentioned, and the other acting to control the other set of movement-transmitters aforesaid; (g) keys controlling the group-controlling members aforesaid; and (h) other keys, acting to position the movement-transmitters aforesaid, independently of each other.

41. In a type-writing machine and in combination, (a) two sets of type-bars; (b) two sets of levers, corresponding respectively to and connected respectively with the type-bars aforesaid; the two sets of type-bar-corresponding levers aforesaid being each disposed arc fashion; (c) two sets of group controlling members disposed on opposite sides of the printing-center; each of said group-controlling members acting to control a different group of the type-bars aforesaid; (d) a set of movement-transmitters intermediate one of the sets of group-controlling members aforesaid and the corresponding set of type-bar-corresponding levers; (e) another set of movement-transmitters intermediate the other set of group-controlling members aforesaid and the set of type-bar-corresponding levers controlled by them; (f) two shifting devices, one acting to control one of the sets of movement-transmitters above mentioned, and the other acting to control the other set of movement-transmitters aforesaid; (g) two motor devices serving respectively for the actuating of the two sets of group-controlling members aforesaid; (h) keys, acting to connect the different group-controlling members aforesaid, each as required, with the corresponding one of the motor devices aforesaid; and (i) other keys, controlling the shifting devices aforesaid.

42. In a type-writing machine, and in combination, (a) two sets of type-bars; (b) two sets of radially or tangentially disposed levers f, f, &c., connected each with a different one of the type-bars aforesaid; (c) two sets of group-controlling members, one set of group-controlling members serving for one set of type-bars and the other set of group-controlling members serving for the other set of type-bars; each group-controlling member serving for a different group of type-bars; (d) two sets of movement-transmitters, to wit, one set of movement-transmitters intermediate one of the sets of group-controlling members aforesaid and the group of radially-disposed levers f, f, controlled by such controlling members; and another set of movement-transmitters intermediate the other set of group-controlling members aforesaid, and the group of radially-disposed levers f, f, controlled respectively by them, and (e) means whereby the two sets of movement-transmitters aforesaid are positioned as required, each set independently of the other.

43. In a type-writing machine, and in combination, (a) two sets of type-bars; (b) two sets of radially or tangentially disposed levers f, f, &c., connected each with a different one of the type-bars aforesaid; (c) two sets of group-controlling members, one set of group-controlling members serving for one set of type-bars and the other set of group-controlling members serving for the other set of type-bars; each group-controlling member serving for a different group of type-bars; (d) two sets of movement-transmitting pins, a pin for each group-controlling member; and (e) independently-shiftable oscillating segmental carriers, wherein said pins are mounted, to move longitudinally independently of one another.

44. In a type-writing machine, and in combination, (a) two sets of type-bars; (b) two sets of radially or tangentially disposed levers f, f, &c., connected each with a different one of the type-bars aforesaid; (c) two sets of group-controlling members, one set of group-controlling members serving for one set of type-bars and the other set of group-controlling members serving for the other set of type-bars; each group-controlling member serving for a different group of type-bars; (d) two sets of movement-transmitters, to wit, one set of movement-transmitters intermediate one of the sets of group-controlling members aforesaid and the groups of radially-disposed levers f, f, controlled by such controlling members; and another set of movement-transmitters intermediate the other set of group-controlling members aforesaid, and the groups of radially-disposed levers f, f, controlled respectively by them, (e) means whereby the two sets of movement-transmitters aforesaid are shifted as required, each set independently of the other; (f) keys, acting to position said carriers, and (g) other keys and means controlled thereby for actuating the group-controlling members of the two sets aforesaid, each as required.

45. In a type-writing machine constructed to afford facility to the operator to make the letters in pairs simultaneously, (a) two sets of type-bars; (b) a set of segment-furnished group-controlling levers, for each set of type-bars, said levers being fewer in number than the type-bars; (c) shiftable connections between one of the sets of group-controlling levers aforesaid and the corresponding type-bars; and (*d*) connections between the group-controlling levers of the other set aforesaid and the type-bars controlled thereby, said connections being shiftable independently of the other shiftable connections aforesaid.

46. In a type-writing machine constructed to afford facility to the operator to make the letters in pairs simultaneously, type-bar-selecting mechanism, including two sets of segment-furnished group-controlling levers; and two oscillating pin-carriers, each carrier having a pin to oscillate over the corresponding one of the segments aforesaid, so that in whatever position it may be it is subject to be acted on by said segment.

47. In a type-writing machine constructed to afford facility to the operator to make the letters in pairs simultaneously, type-bar-selecting mechanism, including two sets of segment-furnished group-controlling levers; two oscillating pin-carriers, each carrier having a pin to oscillate over the corresponding one of the segments aforesaid, so that in whatever position it may be, it is subject to be acted on by said segment; and type-bars and the type-bar-corresponding levers *f, f*, connected therewith.

48. In a selecting mechanism for a duplex type-writing machine, two oscillating pin-carriers, each carrying a plurality of movement-transmitting pins, movable longitudinally independently of each other, and moving bodily as a set with the pin-carrier; each of said pin-carriers occupying a segment of a circle, and each being oscillatable independently of the other.

49. In a type-writing machine constructed to afford facility to the operator to make letters in pairs simultaneously, the combination with two sets of type-bars, of a type-bar-selecting mechanism, including, (*a*) two sets of group-controlling levers disposed on opposite sides of the printing center or centers; (*b*) vibratory frames on opposite sides of the printing-center, one frame for actuating the group-controlling levers of the one set, and the other frame actuating the group-controlling levers of the other set; (*c*) movement-receiving arms pivoted to said group-controlling levers, to receive movement from the corresponding vibratory frames; (*d*) two sets of bell-cranks; (*e*) links, connecting said bell-cranks with the movement-receiving arms pivoted to the corresponding group-controlling levers; and (*f*) keys, for actuating said bell-cranks.

50. In a type-writing machine constructed to afford facility to the operator to make letters in pairs simultaneously, the combination with two sets of type-bars, of a type-bar-selecting mechanism, including, (*a*) two sets of group-controlling levers disposed on opposite sides of the printing center or centers; (*b*) vibratory frames on opposite sides of the printing-center, one frame for actuating the group-controlling levers of the one set, and the other frame actuating the group-controlling levers of the other set; (*c*) movement-receiving arms pivoted to said group-controlling levers to receive movement from the corresponding vibratory frames; (*d*) two sets of bell-cranks; (*e*) links, connecting said bell-cranks with the movement-receiving arms and the corresponding group-controlling levers; (*f*) keys, for actuating said bell-cranks; (*g*) two electromagnets, one serving to actuate one of the vibratory frames aforesaid, and the other to actuate the other of the vibratory frames aforesaid; and (*h*) a circuit-closing frame for each magnet, actuated by the corresponding keys.

51. In a type-writing machine constructed to afford facility to the operator to make letters in pairs simultaneously, and in combination, (*a*) two sets of type-bars, disposed on opposite sides of the printing center or centers; (*b*) two sets of type-bar-corresponding levers each connected with the corresponding type-bar; (*c*) two sets of group-controlling levers disposed on opposite sides of the printing-center; (*d*) shifting connections, intermediate each set of group-controlling levers and the type-bar-corresponding levers operated thereby; the shifting connections of the one set being shiftable independently of the shifting connections of the other set; (*e*) type-bar-impelling frames on opposite sides of the printing-center, one frame for actuating the group-controlling levers of the one set, and the other frame for actuating the group-controlling levers of the other set; (*f*) movement-receiving arms pivoted to the group-controlling levers aforesaid, to receive movement from the type-bar-impelling frames aforesaid; (*g*) two sets of bell-cranks; (*h*) links, connecting said bell-cranks with the movement-receiving arms of the corresponding group-controlling levers, for bringing said movement-receiving arms into operative relation with the corresponding type-bar-impelling frames to receive movement therefrom; (*i*) keys, for actuating said bell-cranks; and (*k*) other keys, controlling the shifting connections aforesaid.

52. In a type-writing machine constructed to afford facility to the operator to make letters in pairs simultaneously, and in combination, (*a*) two sets of type-bars, disposed on opposite sides of the printing center or centers; (*b*) two sets of type-bar-corresponding levers each connected with the corresponding type-bar; (*c*) two sets of group-controlling levers disposed on opposite sides of the printing-center; (*d*) shifting connections, intermediate each set of group-controlling levers and the type-bar-corresponding levers operated thereby; the shifting connections of the one set being shiftable independently of the shifting connections of the other set; (*e*) type-bar-impelling frames on opposite sides of the printing-center, one frame for actuating the group-controlling levers of the one set, and the other frame for actuating the group-controlling levers of the other set; (*f*) movement-receiving arms pivoted to the group-controlling levers aforesaid, to receive movement from the type-bar-impelling frames aforesaid; (*g*) two sets of bell-cranks; (*h*) links, connecting said bell-cranks with the movement-receiving arms of the corresponding group-controlling levers, for bringing said movement-receiving arms into operative relation with the corresponding type-bar-impelling frames to receive movement therefrom; (*i*) keys, for actuating said bell-cranks; (*k*) other keys, controlling the shifting connections aforesaid; (*l*) two electromagnets for actuating the type-bar-impelling frames aforesaid; and (*m*) a circuit-controlling frame, for each electromagnet, actuated by the corresponding key.

53. In a character-selecting device, the combination with a shifting device and a motor, of a controlling device for said motor; said controlling device being connected with the shifting device aforesaid, and acting by its initial movement to prevent the motor device aforesaid from operating, and acting by a continuance of the same movement to permit said motor device to operate, whereby premature operating of said motor device, while the shifting is taking place, is prevented.

54. In a character-selecting device for a keyboard printing instrumentality, the combination with a shifting device, a motor, and a motor-controlling device, of a key giving movement both to said shifting device and said motor-controlling device; said motor-controlling device acting to prevent the premature operating of the motor aforesaid while the shifting is taking place.

55. In a character-selecting device for a keyboard printing instrumentality, the combination with a shifting device, a motor, and a motor-controlling device, of a key giving movement both to said shifting device and said motor-controlling device; said motor-controlling device operating, when actuated by the depressing of the key aforesaid, first to prevent power from being supplied to the motor aforesaid, and then operating to permit the supply of power to said motor, whereby premature operating of said motor, while the shifting is taking place, is prevented.

56. In a character-selecting mechanism for a keyboard printing instrumentality, the combination with a shifting device and an electromagnet, of a circuit-controlling device for said electromagnet, and means whereby said shifting device and said circuit-controlling device are simultaneously actuated, said circuit-controlling device normally closing a break in the circuit of the electromagnet aforesaid, and operating by its initial movement to open such break in the circuit of said magnet, and by a continuance of the same movement to close said break in the circuit of said magnet, whereby premature operating of said magnet while the shifting is taking place, is prevented.

57. In a character-selecting device for a keyboard printing instrumentality, the combination with a shifting device, an electromagnet and a circuit-controller, of a key, giving movement to said shifting device and said circuit-controller, said circuit-controller acting to prevent the magnet aforesaid from operating, while the shifting is taking place.

58. In a character-selecting device for a keyboard printing instrumentality, the combination with a shift-key and a motor device, of a motor-controlling device receiving movement from said shift-key and acting, by its initial movement when said key is depressed, to prevent the motor device aforesaid from operating, but acting, by a continuance of the same movement, to permit said motor to operate, whereby premature operating of the motor device aforesaid, while the shifting is taking place, is prevented.

59. In a keyboard printing instrumentality, and in combination, type-controlling devices corresponding to the letters of the alphabet, keys fewer in number than the letters of the alphabet, and selecting mechanism controlled by said keys, acting singly and in different combinations, for operating the different type-controlling devices aforesaid, each as required; said selecting mechanism including, (*a*) a shifting device; (*b*) a motor device; and (*c*) a motor-controlling device connected with the shifting device aforesaid, and operating, when a plurality of the keys aforesaid, one of them operating the shifting device aforesaid, are depressed simultaneously for the selecting of a letter corresponding to the combination of keys thus simultaneously depressed, to prevent the premature acting of the motor device aforesaid while the shifting is taking place.

60. A character-selecting device for a keyboard printing instrumentality, constructed to afford facility to the operator to produce or select the letters of the alphabet, each as required, by operating upon keys fewer in number than the letters of the alphabet, said device including, in combination with the keys aforesaid, (*a*) a shifting device; (*b*) a motor; (*c*) a motor-controlling device, operated by one or more of the keys aforesaid, and serving by its initial movement when one of the keys controlling it is depressed, to prevent the motor device aforesaid from operating, but acting, by its further movement, to cause or permit said motor device to operate, whereby premature operating of said motor device, while the shifting is taking place, is prevented.

61. In a character-selecting device for a keyboard printing instrumentality, the combination, of (*a*) a shifting device; (*b*) a shift-key, giving movement to said shifting device; (*c*) an electromagnet; and (*d*) a circuit-controlling device receiving movement from the shift-key aforesaid, and acting by its initial movement when said shift-key is depressed, to open a break in the circuit of the magnet aforesaid, but operating by a continuance of the same movement, to close the break in said circuit, whereby premature operating of the electromagnet aforesaid, while the shifting is taking place, is prevented.

62. In a keyboard printing instrumentality, and in combination, type-controlling devices corresponding to the letters of the alphabet; keys, fewer in number than the letters of the alphabet, one or more of said keys being a shift-key; and selecting mechanism controlled by said shift-key or shift-keys, acting conjointly with the other keys aforesaid, said selecting mechanism including, (a) a shifting device, receiving movement from one or more of the shift-keys aforesaid; (b) an electromagnet, and (c) a circuit-controlling device, also receiving movement from one or more of the shift-keys aforesaid, and whereby premature operating of the motor device aforesaid, while the shifting is taking place, is prevented.

63. In a character-selecting device, and in combination, (a) a plurality of groups of character-corresponding devices; (b) group-controlling members, each serving to control one of the groups of character-corresponding devices aforesaid; (c) shifting mechanism, whereby the different character-corresponding devices operated by one of the group-controlling members aforesaid are brought into operative relation with said group-controlling members, each as required; (d) keys, and motor mechanism controlled thereby, for operating the group-controlling members aforesaid; and (e) means connected with the shifting mechanism aforesaid, and operating to prevent the premature actuating of a group-controlling member by the motor mechanism aforesaid, while the shifting is taking place.

64. In a character-selecting device, and in combination, (a) a plurality of groups of character-corresponding devices; (b) group-controlling members, each serving to control one of the groups of character-corresponding devices aforesaid; (c) shifting mechanism, whereby the different character-corresponding devices operated by one of the group-controlling members aforesaid are brought into operative relation with said group-controlling members, each as required; (d) keys, and motor mechanism controlled thereby, for operating the group-controlling members aforesaid; (e) one or more keys controlling the shifting mechanism aforesaid; and (f) means operated by one or more of the keys last mentioned, said means acting to prevent the premature actuating of the group-controlling members aforesaid, while the shifting mechanism aforesaid is operating.

65. In a character-selecting device, and in combination, (a) a plurality of groups of character-corresponding devices; (b) group-controlling members, each serving to control one of the groups of character-corresponding devices aforesaid; (c) shifting mechanism, whereby the different character-corresponding devices operated by one of the group-controlling members aforesaid are brought into operative relation with said group-controlling members, each as required; (d) electromagnetic motor mechanism for actuating the group-controlling devices aforesaid, each as required; and (e) a circuit-controlling device for said electromagnetic motor mechanism, operating to prevent premature circuit-closing while the shifting mechanism aforesaid is operating.

66. In a character-selecting device, and in combination, (a) a plurality of groups of character-corresponding devices; (b) group-controlling members, each serving to control one of the groups of character-corresponding devices aforesaid; (c) shifting mechanism, whereby the different character-corresponding devices operated by one of the group-controlling members aforesaid are brought into operative relation with said group-controlling members, each as required; (d) keys, and electromagnetic motor mechanism controlled thereby for operating the group-controlling members aforesaid each as required; (e) one or more keys controlling the shifting mechanism aforesaid; and (f) means operated by one or more of the keys last mentioned, acting to prevent premature circuit-closing while the shifting is taking place.

67. In a type-writing machine, the combination with type-bars striking to a common printing-center and suitable motor mechanism for impelling said type-bars, each as required, of (a) a shifting mechanism; and (b) a motor-controlling device, connected with said shifting mechanism and operating by its initial movement to prevent the motor mechanism aforesaid from acting to impel a type-bar, but operating, by a continuation of the same movement, to permit said motor to act to impel a type-bar.

68. In a type-writing machine and in combination, (a) type-bars striking to a common printing-center; (b) keys and suitable motor mechanism controlled thereby for actuating said type-bars, each as required; (c) a shifting device; (d) a motor-controlling device; and (e) one or more keys at the keyboard for giving movement to said shifting device and said motor-controlling device; said motor-controlling device operating to prevent the premature impelling of a type-bar by the motor mechanism aforesaid, while the shifting is taking place.

69. In a type-writing machine, and in combination, (a) a key; (b) type-selecting means, positioned by said key; (c) an electromagnet, and (d) a circuit-controlling device operated by said key; said circuit-controlling device normally closing a break in the circuit of the electromagnet aforesaid, and serving, when actuated by the key aforesaid, first, to open said break in the circuit, and then, as the key aforesaid approaches the limit of its movement, to close said break, whereby the electromagnet aforesaid is prevented from acting prematurely, while the positioning of the type-selecting means aforesaid is taking place.

70. In a type-writing machine, the combination with the set of type-bars, an electromagnetic type-bar-impelling mechanism and a shifting mechanism, of a circuit-controlling device coacting with said shifting mechanism; said circuit-controlling device normally closing a break in the circuit and operating by its initial movement to open said break, and serving by a continuance of the same movement to close said break, thereby preventing the electromagnetic type-bar-impelling mechanism aforesaid from operating prematurely while the shifting is taking place.

71. In a type-writing machine and in combination; (*a*) type-bars striking to a common printing-center; (*b*) keys and electromagnetic mechanism controlled thereby, for actuating said type-bars; (*c*) a shifting device whereby different type-bars are brought into operative relation with the electromagnetic mechanism aforesaid, to receive movement therefrom, each as required; (*d*) a circuit-controlling device; and (*e*) a key, giving movement to the shifting device aforesaid and the circuit-controlling device aforesaid; said circuit-controlling device acting to prevent the electromagnetic mechanism aforesaid from operating prematurely while the shifting is taking place.

72. In a type-bar-selecting device, the combination, with a plurality of type-bars striking to a common printing-center and a motor for impelling all said type-bars, each as required, of (*a*) a shiftable connection intermediate said motor device and said type-bars; (*b*) a key, giving movement to said shiftable connection; (*c*) a motor-controlling device, also receiving movement from said key and operating to prevent the premature actuating of a type-bar by the motor aforesaid while the shiftable connection aforesaid is being positioned.

73. In a type-bar-selecting device, the combination with a plurality of type-bars striking to a common printing-center and an electromagnet for impelling all said type-bars, each as required, of a shiftable connection intermediate said electromagnet and said type-bars; and a circuit-controlling device mechanically connected with said shiftable connection, said circuit-controlling device normally closing a break in the circuit of the electromagnet aforesaid and operating by its initial movement to open said break in said circuit, but operating by a continuance of the same movement to close said break, whereby premature acting of the magnet aforesaid, while the shiftable connection aforesaid is being positioned, is prevented.

74. In a type-bar-selecting device, the combination with a plurality of type-bars striking to a common printing-center and an electromagnet for impelling all said type-bars, each type-bar as required, of (*a*) a shiftable connection intermediate said electromagnet and said type-bars; (*b*) a key, giving movement to said shiftable connection; and (*c*) a motor-controlling device, also receiving movement from said key and serving to prevent premature action of the magnet aforesaid while the shiftable connection aforesaid is being positioned.

75. In a type-bar-selecting device, the combination with a plurality of type-bars striking to a common printing-center and an electromagnet for impelling all said type-bars, each type-bar as required, of (*a*) a shiftable connection intermediate said electromagnet and said type-bars; (*b*) one or more keys for positioning said shiftable connection; and (*c*) a circuit-controlling device operated by one or more of said keys; said circuit-controlling device normally closing a break in the circuit of the magnet aforesaid and serving, when actuated by one of the keys aforesaid, first to open said break in said circuit, and then, as said key and said shiftable connection impelled thereby, approach the limit of their movement, to close said break in said circuit, whereby the electromagnet aforesaid is prevented from acting prematurely while the shiftable connection aforesaid is being positioned.

76. In a type-writing machine, the combination with type-bars striking to a common printing-center, of a type-bar-selecting device; including, (*a*) a pin-carrier; (*b*) one or more keys for positioning said pin-carrier; (*c*) a type-bar-impelling motor; and, (*d*) a controlling device for said motor operated by one or more of the keys aforesaid, and serving to prevent the premature acting of said motor to impel a type-bar, while the pin-carrier aforesaid is being shifted.

77. In a type-writing machine, the combination with type-bars striking to a common printing-center, of a type-bar-selecting device; including, (*a*) a pin-carrier; (*b*) one or more keys for positioning said pin-carrier; (*c*) a type-bar-impelling electromagnet; and (*d*) a circuit-controlling device for said electromagnet, operated by one or more of the keys aforesaid, and serving to prevent the premature closing of the circuit of the magnet aforesaid, while the pin-carrier aforesaid is being shifted.

78. In a type-writing machine, and in combination, (*a*) a plurality of groups of type-bars, striking to a common printing-center; (*b*) group-controlling members, each serving to control a different one of the groups of type-bars aforesaid; (*c*) shifting mechanism, whereby the different type-bars aforesaid, controlled by one of the group-controlling members aforesaid, are brought into operative relation with said group-controlling members, each as required; (*d*) keys, and motor mechanism controlled thereby, for operating the group-controlling members aforesaid, each as required; and (*e*) means connected with the shifting mechanism aforesaid, operating to prevent the premature actuating of a group-controlling member, while the shifting is taking place.

79. In a type-writing machine, and in combination, (a) a plurality of groups of type-bars, striking to a common printing-center; (b) group-controlling members, each serving to control a different one of the groups of type-bars aforesaid; (c) shifting mechanism, whereby the different type-bars aforesaid, controlled by one of the group-controlling members aforesaid, are brought into operative relation with said group-controlling members, each as required; (d) keys, and motor mechanism controlled thereby, for operating the group-controlling members aforesaid, each as required; (e) one or more keys controlling the shifting mechanism aforesaid; and (f) means operated by one or more of the keys last mentioned for preventing the premature actuating of the group-controlling members aforesaid, while the shifting is taking place.

80. In a type-writing machine, and in combination, (a) a plurality of groups of type-bars, striking to a common printing-center; (b) group-controlling members, each serving to control a different one of the groups of type-bars aforesaid; (c) shifting mechanism, whereby the different type-bars aforesaid, controlled by one of the group-controlling members aforesaid, are brought into operative relation with said group-controlling members, each as required; (d) electromagnetic motor mechanism for actuating the group-controlling members aforesaid, each as required; and (e) circuit-controlling means for said electromagnetic motor mechanism, operating to prevent the premature actuating of a group-controlling member by the electromagnetic motor mechanism aforesaid, while the shifting mechanism aforesaid is operating.

81. In a type-writing machine, and in combination, (a) a plurality of groups of type-bars, striking to a common printing-center; (b) group-controlling members, each serving to control a different one of the groups of type-bars aforesaid; (c) shifting mechanism, whereby the different type-bars aforesaid, controlled by one of the group-controlling members aforesaid, are brought into operative relation with said group-controlling members, each as required; (d) keys and electromagnetic mechanism controlled thereby for operating the group-controlling members aforesaid, each as required; (e) one or more keys controlling the shifting mechanism aforesaid; and (f) a circuit-controlling device operated by one or more of the keys last mentioned, and serving to prevent the premature actuating of the group-controlling members aforesaid, while the shifting mechanism aforesaid is acting.

82. In a type-writing machine, and in combination, (a) type-bars striking to a common printing-center; (b) type-bar-corresponding levers, each connected with and corresponding to one of the type-bars aforesaid; (c) group-controlling members each serving to control a different group of the type-bars aforesaid; (d) shiftable connections intermediate said group-controlling members and the type-bar-corresponding levers aforesaid, whereby the different type-bar-corresponding levers aforesaid of a group, are brought into operative relation, each as required, with the corresponding group-controlling member; (e) motor mechanism for actuating the group-controlling members aforesaid, each as required; and (f) means connected with the shiftable connections aforesaid, operating to prevent the premature actuating of the group-controlling members aforesaid by the motor mechanism aforesaid, while the shiftable connections aforesaid are being positioned.

83. In a type-writing machine, and in combination, (a) type-bars striking to a common printing-center; (b) type-bar-corresponding levers, each connected with and corresponding to one of the type-bars aforesaid; (c) group-controlling members each serving to control a different group of the type-bars aforesaid; (d) shiftable connections intermediate said group-controlling members and the type-bar-corresponding levers aforesaid, whereby the different type-bar-corresponding levers aforesaid of a group, are brought into operative relation, each as required with the corresponding group-controlling member; (e) keys, and motor mechanism controlled thereby, for actuating the group-controlling members aforesaid, each as required; (f) one or more keys for positioning the shiftable connections aforesaid; and (g) means operated by one or more of the keys last mentioned, serving to prevent the premature actuating of the group-controlling members aforesaid by the motor mechanism aforesaid, while the shiftable connections aforesaid are being positioned.

84. In a type-writing machine, and in combination, (a) type-bars, striking to a common printing-center; (b) type-bar-corresponding levers, each connected with and corresponding to one of the type-bars aforesaid; (c) group-controlling members, each serving to control a different group of the type-bars aforesaid; (d) shiftable connections intermediate said group-controlling members and the type-bar-corresponding levers aforesaid, whereby the different type-bar-corresponding levers aforesaid of a group, are brought into operative relation, each as required, with the corresponding group-controlling member; (e) a frame for giving movement to the different group-controlling members aforesaid; (f) keys, and means controlled thereby, whereby said group-controlling members are connected, each as required, with said frame; (g) a motor for actuating said frame; (h) one or more keys for positioning the shiftable connections aforesaid; and (i) means, operated by one or more of the keys last mentioned, and acting to prevent premature impelling of the frame aforesaid, by the motor 85. In a type-writing machine, and in combination, (a) type-bars striking to a common printing-center; (b) type-bar-corresponding levers, each connected with and corresponding to one of the type-bars aforesaid; (c) group-controlling levers, each serving to actuate a different group of the type-bars aforesaid; (d) movement-transmitting pins, one for each group-controlling lever, and a carrier, wherein said pins are mounted to move longitudinally independently of each other, and to move as a set with said carrier intermediate the group-controlling levers aforesaid and the type-bar-corresponding levers aforesaid, whereby the different type-bar-corresponding levers of a group are brought into operative relation, each as required, with the group-controlling levers controlling such group; (e) a frame for giving movement to the different group-controlling levers aforesaid; (f) keys, and means controlled thereby, whereby said group-controlling levers are connected, each as required, with said frame; (g) a motor for actuating said frame; (h) one or more keys for positioning the pin-carrier aforesaid; and (i) means operated by one or more of said keys, acting to prevent the premature impelling of the frame aforesaid by the motor aforesaid, while the pin-carrier is being positioned.

86. In a type-writing machine, and in combination, (a) type-bars, striking to a common printing-center; (b) type-bar-corresponding levers, each connected with and corresponding to one of the type-bars aforesaid; (c) group-controlling members, each serving to control a different group of the type-bars aforesaid; (d) shiftable connections intermediate said group-controlling members and the type-bar-corresponding levers aforesaid, whereby the different type-bar-corresponding levers aforesaid of a group, are brought into operative relation, each as required, with the corresponding group-controlling member; (e) a frame for giving movement to the different group-controlling members aforesaid; (f) keys and means controlled thereby whereby said group-controlling members are connected, each as required, with said frame; (g) an electromagnet for actuating said frame; (h) one or more keys for positioning the shiftable connections aforesaid; and (i) a circuit-controlling means, operated by one or more of the keys last mentioned, and acting to prevent the premature impelling of the frame aforesaid by the magnet aforesaid, while the shiftable connections aforesaid are being positioned.

87. In a type-writing machine, and in combination, (a) type-bars striking to a common printing-center; (b) type-bar-corresponding levers, each connected with and corresponding to one of the type-bars aforesaid; (c) group-controlling levers, each serving to actuate a different group of the type-bars aforesaid; (d) movement-transmitting pins, one for each group-controlling lever, and a carrier, wherein said pins are mounted to move longitudinally independently of each other, and to move as a set with said carrier intermediate the group-controlling levers aforesaid and the type-bar-corresponding levers aforesaid, whereby the different type-bar-corresponding levers of a group are brought into operative relation, each as required, with the group-controlling levers controlling such group; (e) a motor-frame for giving movement to the different group-controlling levers aforesaid; (f) keys, and means controlled thereby whereby said group-controlling levers are connected, each as required, with said motor-frame; (g) an electromagnet for actuating said frame; (h) one or more keys for positioning the pin-carrier aforesaid; and (i) circuit-controlling means operated by one or more of said keys, acting to prevent the premature impelling of the motor-frame aforesaid, by the magnet aforesaid, while the pin-carrier aforesaid is being positioned.

88. In a character-selecting device for a keyboard printing instrumentality, in which the letters of the alphabet are selected, as required, by operating upon keys fewer in number than the letters of the alphabet, and in combination, (a) a shifting device; (b) a plurality of keys for positioning said shifting device; and (c) stopping mechanism, controlled by one or more of the keys aforesaid, whereby said shifting device is arrested.

89. In a character-selecting device for a keyboard printing instrumentality, in which the letters of the alphabet are selected as required by operating upon keys fewer in number than the letters in the alphabet, and in combination, (a) a shifting device; (b) a plurality of keys for positioning said shifting device; (c) a fixed stop for arresting said shifting device at its extreme position; and (d) a movable stop, controlled by one or more of the keys aforesaid, for arresting said shifting device in a position intermediate its normal position and the extreme position aforesaid.

90. In a character-selecting device for a keyboard printing instrumentality, and in combination, (a) a plurality of groups of character-corresponding devices; (b) group-controlling devices, each serving to control a different group of the character-corresponding devices aforesaid; (c) shiftable connections intermediate said group-controlling devices and said character-corresponding devices; (d) a plurality of keys at the keyboard for positioning said shiftable connections; and (e) stopping means, controlled by one or more of the keys aforesaid, for arresting said shiftable connections in the positions required.

91. In a character-selecting device for a keyboard printing instrumentality, and in combination, (a) a plurality of groups of character-corresponding devices; (b) group-controlling members, each serving to control a different group of the character-corresponding devices aforesaid; (c) keys, and motor mechanism controlled thereby, whereby said group-controlling members are actuated, each as required; (d) shiftable connections intermediate said group-controlling members and said character-corresponding devices; (e) a plurality of keys at the keyboard for positioning said shiftable connections; (f) stopping means, controlled by one or more of the keys aforesaid, for arresting said shiftable connections in the positions required.

92. In a character-selecting device for a keyboard printing instrumentality, and in combination, (a) a plurality of groups of character-corresponding devices; (b) group-controlling members, each serving to control a different group of the character-corresponding devices aforesaid; (c) movement-transmitting pins—a pin for each group-controlling member—intermediate the group-controlling members aforesaid and the character-corresponding devices controlled thereby; (d) a carrier, wherein said pins are mounted to move longitudinally independently of each other, and to move as a set, intermediate the group-controlling members aforesaid and the character-corresponding devices aforesaid, to bring said group-controlling members into operative relation with the different character-corresponding devices controlled respectively by them; (e) a plurality of keys at the keyboard for positioning said pin-carrier; and (f) stopping means, controlled by one or more of the keys aforesaid, for arresting said pin-carrier in the position required.

93. In a character-selecting device for a keyboard printing instrumentality, and in combination, (a) a plurality of groups of character-corresponding devices; (b) group-controlling members, each serving to control a different group of the character-corresponding devices aforesaid; (c) keys, and motor mechanism controlled thereby, whereby said group-controlling members are actuated, each as required; (d) movement-transmitting pins—a pin for each group-controlling member—intermediate the group-controlling members aforesaid and the character-corresponding devices controlled thereby; (e) a carrier, wherein said pins are mounted to move longitudinally independently of each other, and to move as a set, intermediate the group-controlling members aforesaid and the character-corresponding devices aforesaid, to bring said group-controlling members into operative relation with the different character-corresponding devices controlled respectively by them; (f) a plurality of keys at the keyboard for positioning said pin-carrier; and (g) stopping means, controlled by one or more of the keys aforesaid, for arresting said pin-carrier in the position required.

94. In a type-writing machine, and in combination therein with type-bars, striking to a common printing-center, a type-bar-selecting device, including, (a) a shifter; (b) a plurality of keys, for positioning said shifter; and (c) stopping means, controlled by one or more of the keys aforesaid, whereby the shifter aforesaid is arrested in the position required.

95. In a type-writing machine, and in combination therein with type-bars, striking to a common printing-center, a type-bar-selecting device, including, (a) a shifter; (b) a plurality of keys, for positioning said shifter; (c) a fixed stop for arresting said shifter in its extreme position; and (d) a movable stop, controlled by one or more of the keys aforesaid, for arresting said shifter in a position intermediate its normal position and the extreme position aforesaid.

96. In a type-writing machine, and in combination, (a) a plurality of groups of type-bars, striking to a common printing-center; (b) group-controlling devices, each serving to control a different group of the type-bars aforesaid; (c) shiftable connections intermediate said group-controlling devices and the type-bars aforesaid; (d) a plurality of keys for positioning said shiftable connections; and (e) stopping means, controlled by one or more of the keys aforesaid, for arresting said shiftable connections in the positions required.

97. In a type-writing machine, and in combination, (a) a plurality of groups of type-bars, striking to a common printing-center; (b) type-bar-corresponding levers each connected with the corresponding type-bar; (c) group-controlling devices each serving to control a different group of the type-bars aforesaid; (d) movement-transmitting pins—a pin for each of the group-controlling devices aforesaid—intermediate the group-controlling devices aforesaid and the type-bar-corresponding levers aforesaid; (e) a carrier, wherein said pins are mounted to move longitudinally independently of each other and to move as a set intermediate the group-controlling devices aforesaid and the type-bar-corresponding levers aforesaid; (f) a plurality of keys for positioning said carrier; and (g) stopping means, controlled by one or more of the keys aforesaid, for arresting said pin-carrier in the position required.

98. In a type-bar-selecting device, the combination with a plurality of type-bars, striking to a common printing-center, and a motor for impelling all said type-bars each as required, of (a) a shiftable connection, intermediate said motor and said type-bars; (b) a plurality of keys for positioning said shiftable connection; and (c) stopping means, controlled by one or more of the keys aforesaid, for arresting said shiftable connection in the position required.

99. In a type-bar-selecting device, the combination with a plurality of type-bars, striking to a common printing-center, and a motor for impelling all said type-bars, each as required, of (a) a shiftable connection, intermediate said motor and said type-bars; (b) a plurality of keys for positioning said shiftable connection; (c) a fixed stop, for arresting said shiftable connection in its extreme position; and (d) a movable stop, controlled by one or more of the keys aforesaid, for arresting said shiftable connection in a position intermediate its normal position and the extreme position aforesaid.

100. In a type-writing machine, and in combination, (a) a plurality of groups of type-bars, striking to a common printing-center; (b) group-controlling members, each serving to control a different group of the type-bars aforesaid; (c) keys, and motor mechanism controlled thereby, whereby said group-controlling members are actuated, each as required; (d) shiftable connections, intermediate said group-controlling members, and the type-bars aforesaid; (e) a plurality of keys, for positioning said shiftable connections; and (f) stopping means, controlled by one or more of the keys aforesaid, for arresting the shiftable connections aforesaid in the positions required.

101. In a type-writing machine, and in combination, (a) a plurality of groups of type-bars, striking to a common printing-center; (b) type-bar-corresponding levers, each connected with the corresponding type-bar; (c) group-controlling members, each serving to control a different group of the type-bars aforesaid; (d) keys, and motor mechanism controlled thereby, whereby said group-controlling members are actuated, each as required; (e) movement-transmitting pins—a pin for each group-controlling member—intermediate the group-controlling members and the type-bar-corresponding levers aforesaid; (f) a carrier, wherein said pins are mounted to move longitudinally independently of each other, and to move as a set intermediate the group-controlling members aforesaid and the type-bar-corresponding levers aforesaid; (g) a plurality of keys for positioning said carrier; and (h) stopping means, controlled by one or more of the keys aforesaid, for arresting said carrier in the position required.

102. In a type-writing machine and in combination, (a) a type-bar; (b) an electromagnet for impelling the same; (c) a key, at the keyboard, acting, when depressed, to close the circuit of the electromagnet aforesaid; (d) a circuit-controller, in the circuit of the electromagnet aforesaid, normally closing a break in said circuit; said electromagnet acting, as it impels the type-bar aforesaid, upon the circuit-controller aforesaid to break the circuit of said electromagnet, thereby to permit the type-bar aforesaid and the electromagnet aforesaid, to return toward their normal positions in advance of the release of the key aforesaid; and (e) means, acting to keep the circuit of said electromagnet open, after said magnet has returned toward its normal position, and while the key aforesaid is depressed.

103. In a type-writing machine and in combination, (a) a type-bar; (b) an electromagnet for impelling the same; (c) a key, at the keyboard, acting, when depressed, to close the circuit of the electromagnet aforesaid; (d) a circuit-controller, in the circuit of the electromagnet aforesaid, normally closing a break in said circuit, said electromagnet acting, as it impels the type-bar aforesaid, upon the circuit-controller aforesaid to break the circuit of said electromagnet, thereby to permit the type-bar aforesaid and the electromagnet aforesaid, to return toward their normal positions in advance of the release of the key aforesaid; and (e) a detent device, for the circuit-controller aforesaid, including an electromagnet, in a circuit distinct from that of the type-bar-impelling electromagnet aforesaid, said detent device acting to keep the circuit of the type-bar-impelling electromagnet aforesaid open after said magnet has returned toward its normal position, and while the key aforesaid is depressed.

104. In a type-writing machine and in combination, (a) a type-bar; (b) an electromagnet for impelling the same; (c) a key, at the keyboard, acting, when depressed, to close the circuit of the electromagnet aforesaid; (d) a circuit-controller, in the circuit of the electromagnet aforesaid, normally closing a break in said circuit; said electromagnet acting, as it impels the type-bar aforesaid, upon the circuit-controller aforesaid to break the circuit of said electromagnet, thereby to permit the type-bar aforesaid and the electromagnet aforesaid, to return toward their normal positions in advance of the release of the key aforesaid; and (e) a detent-electromagnet, for the circuit-controller aforesaid, said detent-electromagnet being in a circuit controlled by the key aforesaid, and which is uninterruptedly closed so long as said key is depressed.

105. In a type-writing machine and in combination, (a) a type-bar; (b) an electromagnet for impelling the same; (c) a key, at the keyboard, acting, when depressed, to close the circuit of the electromagnet aforesaid; (d) a circuit-controlling lever, in the circuit of the electromagnet aforesaid, normally closing a break in said circuit; the electromagnet aforesaid acting, as it impels the type-bar aforesaid, upon said circuit-controlling lever, to break the circuit of said electromagnet, thereby to permit the type-bar aforesaid and the electromagnet aforesaid, to return toward their normal positions in advance of the release of the key aforesaid; and (e) a detent electromagnet, controlled by the key aforesaid, and serving to attract the circuit-controlling lever aforesaid or an armature connected therewith, thereby to keep the circuit of the type-bar-impelling magnet aforesaid open after said magnet has returned toward its normal position, and while the key aforesaid is held down.

106. In a type-writing machine, and in combination, (a) a plurality of groups of type-bars; (b) group-controlling members, each serving to give movement to a different group of the type-bars aforesaid; (c) means, intermediate said group-controlling members and said type-bars, whereby each group-controlling member is made to act upon the different type-bars of the group controlled by it, each type-bar as required; (d) a motor device for actuating said group-controlling members; (e) a motor-controlling device, operated by said motor device, whereby the type-bar-impelling action of the motor aforesaid is stopped, and the group-controlling member and type-bar operated by said motor left free to return toward their normal positions.

107. In a type-writing machine, and in combination, (a) a plurality of groups of type-bars; (b) group-controlling members, each serving to give movement to a different group of the type-bars aforesaid; (c) means, intermediate said group-controlling members and said type-bars, whereby each group-controlling member is made to act upon the different type-bars of the group controlled by it, each type-bar as required; (d) a vibratory frame; (e) keys, and means controlled thereby, whereby the different group-controlling members aforesaid are brought into operative relation, each as required, with the frame aforesaid, to receive movement therefrom; (f) an electromagnet, controlled by said keys, for actuating said frame; and (g) a circuit-controller, operated by the magnet aforesaid, and acting to cut off current from said electromagnet, thereby to permit the return of the frame aforesaid toward its normal position, releasing the type-bar in advance of the release of the key depressed.

108. In a type-writing machine, and in combination, (a) a plurality of groups of type-bars; (b) group-controlling members, each serving to give movement to a different group of the type-bars aforesaid; (c) means, intermediate said group-controlling members and said type-bars, whereby each group-controlling member is made to act upon the different type-bars of the group controlled by it, each type-bar as required; (d) a vibratory frame; (e) keys, and means controlled thereby, whereby the different group-controlling members aforesaid are brought into operative relation, each as required, with the frame aforesaid, to receive movement therefrom; (f) an electromagnet, controlled by said keys, for actuating said frame; (g) a circuit-controller, operated by the magnet aforesaid, and acting to cut off current from said electromagnet, thereby to permit the return of the frame aforesaid toward its normal position, releasing the type-bar in advance of the release of the key depressed; and (h) another electromagnet, in a circuit distinct from that of the type-bar-impelling electromagnet aforesaid, acting as a detent for the circuit-controller aforesaid.

109. In a type-writing machine, and in combination, (a) a plurality of groups of type-bars; (b) type-bar-corresponding levers, each connected with the corresponding type-bar; (c) group-controlling members, each serving to give movement to a different group of the type-bars aforesaid; (d) movement-transmitting pins—a pin for each group-controlling member—intermediate the group-controlling members aforesaid and the type-bar-corresponding levers aforesaid; (e) a carrier, wherein said pins are mounted, to move longitudinally independently of each other, and to move as a set with said carrier intermediate the group-controlling members aforesaid and the type-bar-corresponding levers aforesaid, to bring each group-controlling member into operative relation with the different type-bar-corresponding levers controlled by said group-controlling member, each type-bar-corresponding lever as required; (f) a motor device, for actuating the group-controlling members aforesaid; (g) keys, and means controlled thereby, whereby the different group-controlling members aforesaid are brought into operative relation, each as required, with the motor device aforesaid, and whereby said motor device is brought into action, to give movement to the group-controlling member thus in operative relation with it; (h) one or more keys, for positioning the pin-carrier aforesaid; and (i) means, operated by the motor device aforesaid, for stopping said motor device, thereby to permit the return of the group-controlling member and type-bar actuated by it toward their normal positions in advance of the release of the key depressed.

110. In a type-writing machine, and in combination, (a) a plurality of groups of type-bars; (b) type-bar-corresponding levers, each connected with the corresponding type-bar; (c) group-controlling members, each serving to give movement to a different group of the type-bars aforesaid; (d) movement-transmitting pins—a pin for each group-controlling member—intermediate the group-controlling members aforesaid and the type-bar-corresponding levers aforesaid; (e) a carrier, wherein said pins are mounted, to move longitudinally independently of each other, and to move as a set with said carrier intermediate the group-controlling members aforesaid and the type-bar-corresponding levers aforesaid, to bring each group-controlling member into operative relation with the different type-bar-corresponding levers controlled by said group-controlling member, each type-bar-corresponding lever as required; (f) a vibratory frame, normally stationary; (g) keys, and means controlled thereby, whereby the different group-controlling members aforesaid are brought into operative relation, each as required, with the vibratory frame aforesaid, to receive movement therefrom; (h) an electromagnet, controlled by the keys aforesaid for actuating said frame; (i) one or more keys, for positioning the pin-carrier aforesaid; (k) a circuit-controller, operated by the electromagnet aforesaid, and acting to cut off the current from said magnet, thereby to permit the return of the frame aforesaid and the type-bar actuated thereby, toward their normal positions, in advance of the release of the key depressed.

111. In a type-writing machine, and in combination, (a) a plurality of groups of type-bars; (b) type-bar-corresponding levers, each connected with the corresponding type-bar; (c) group-controlling members, each serving to give movement to a different group of the type-bars aforesaid; (d) movement-transmitting pins—a pin for each group-controlling member—intermediate the group-controlling members aforesaid and the type-bar-corresponding levers aforesaid; (e) a carrier, wherein said pins are mounted, to move longitudinally independently of each other, and to move as a set with said carrier intermediate the group-controlling members aforesaid and the type-bar-corresponding levers aforesaid, to bring each group-controlling member into operative relation with the different type-bar-corresponding levers controlled by said group-controlling member, each type-bar-corresponding lever as required; (f) a vibratory frame, normally stationary; (g) keys, and means controlled thereby, whereby the different group-controlling members aforesaid are brought into operative relation, each as required, with the vibratory frame aforesaid, to receive movement therefrom; (h) an electromagnet, controlled by the keys aforesaid for actuating said frame; (i) one or more keys, for positioning the pin-carrier aforesaid; (k) a circuit-controller, operated by the electromagnet aforesaid, and acting to cut off the current from said magnet, thereby to permit the return of the frame aforesaid and the type-bar actuated thereby, toward their normal positions, in advance of the release of the key depressed; and (l) another electromagnet, in a circuit distinct from that of the type-bar-impelling electromagnet aforesaid, acting as a detent for the circuit-controller aforesaid.

In testimony whereof I have hereunto set my hand, at Washington, in the District of Columbia, this 31st day of January, A. D. 1898, in the presence of the subscribing witnesses, whose names are hereto affixed.

THADDEUS CAHILL.

Attest:
GEO. F. CAHILL,
ARTHUR T. CAHILL.